United States Patent
Simon et al.

(10) Patent No.: US 11,349,804 B2
(45) Date of Patent: *May 31, 2022

(54) SUBSCRIBER SESSION DIRECTOR

(71) Applicant: AT&T INTELLECTUAL PROPERTY I, L.P., Atlanta, GA (US)

(72) Inventors: Sean Simon, Lake Stevens, WA (US); Shilpa Kamdar, Irvine, CA (US); David Storm, Arlington, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,700

(22) Filed: Sep. 14, 2020

(65) Prior Publication Data
US 2020/0412689 A1 Dec. 31, 2020

Related U.S. Application Data

(63) Continuation of application No. 16/262,885, filed on Jan. 30, 2019, now Pat. No. 10,812,443, which is a
(Continued)

(51) Int. Cl.
*H04L 61/4552* (2022.01)
*H04L 61/4511* (2022.01)
(Continued)

(52) U.S. Cl.
CPC ...... *H04L 61/1552* (2013.01); *H04L 61/1511* (2013.01); *H04W 72/10* (2013.01); *H04W 76/10* (2018.02)

(58) Field of Classification Search
CPC ............ H04L 61/1552; H04L 61/1511; H04W 76/10; H04W 72/10
See application file for complete search history.

(56) References Cited

U.S. PATENT DOCUMENTS 8,842,538 B2 9/2014 Liao
9,019,974 B2 4/2015 McCann et al.
(Continued)

FOREIGN PATENT DOCUMENTS

WO 2012068946 5/2012

OTHER PUBLICATIONS

"Optimize DNS, Secure and Ensure Availability, and Monetize Usage", BIG-IP Global Traffic Manager, 2015, , F5 Networks, Inc, Seattle, WA, 2015, 16 pages.
(Continued)

*Primary Examiner* — Kristie D Shingles
(74) *Attorney, Agent, or Firm* — Amin, Turocy & Watson, LLP

(57) ABSTRACT

Determining a resolved DNS response based on one or more resolutions for a received APN DNS query is disclosed. A resolved DNS response can be based on real-time analysis of a first query and/or on historical resolution of a second query that is sufficiently similar to the first query. In an aspect, training queries can be employed to populate a data store with preferred DNS responses correlated to the training queries and associated network conditions. The data store can then be employed to evaluate a received query, and where sufficiently similar to a training query, corresponding resolution from the training query can be provided as a resolution for the received query. Moreover, as stored query information is determined to become stale, refreshment techniques are disclosed. Additionally, training queries can comprise anticipated queries and historical queries.

20 Claims, 10 Drawing Sheets

Related U.S. Application Data continuation of application No. 15/161,180, filed on May 20, 2016, now Pat. No. 10,230,685.

(51) Int. Cl.
  *H04W 76/10* (2018.01)
  *H04W 72/10* (2009.01)

(56) References Cited

U.S. PATENT DOCUMENTS

| | | | |
|---|---|---|---|
| 9,220,110 | B2 | 12/2015 | Rune et al. |
| 9,277,538 | B2 | 3/2016 | Mihaly et al. |
| 9,538,560 | B1 | 1/2017 | Velandy et al. |
| 9,578,567 | B1 | 2/2017 | Laganier et al. |
| 9,787,726 | B2 | 10/2017 | Russell et al. |
| 10,812,443 | B2 * | 10/2020 | Simon ............... H04W 72/10 |
| 2005/0253722 | A1 | 11/2005 | Droms et al. |
| 2010/0291943 | A1 | 11/2010 | Mihaly et al. |
| 2011/0075568 | A1 | 3/2011 | Omar |
| 2013/0080612 | A1 | 3/2013 | Armstrong et al. |
| 2013/0114463 | A1 | 5/2013 | Li |
| 2014/0064099 | A1 | 3/2014 | Kuroda |
| 2015/0055461 | A1 | 2/2015 | Hahn |
| 2015/0085828 | A1 | 3/2015 | Chen |
| 2015/0181462 | A1 | 6/2015 | Iwai et al. |
| 2015/0188877 | A1 | 7/2015 | Yan et al. |
| 2016/0301762 | A1 | 10/2016 | Strijkers et al. |
| 2017/0111826 | A1 | 4/2017 | Sankar et al. |
| 2017/0126618 | A1 | 5/2017 | Bhaskaran et al. |
| 2017/0244777 | A1 | 8/2017 | Ouyang et al. |

OTHER PUBLICATIONS

Office Action dated Feb. 21, 2018 for U.S. Appl. No. 15/161,180, 20 pages.

Office Action dated Jun. 27, 2018 for U.S. Appl. No. 15/161,180, 13 pages.

Office Action dated Feb. 24, 2020 for U.S. Appl. No. 16/262,885, 15 pages.

* cited by examiner

SUBSCRIBER SESSION DIRECTOR

RELATED APPLICATIONS

The subject application is a continuation of, and claims priority to each of, U.S. patent application Ser. No. 16/262,885, filed 30 Jan. 2019, and entitled "SUBSCRIBER SESSION DIRECTOR," issued as U.S. Pat. No. 10,812,443, which is a continuation of, and claims priority to, U.S. patent application Ser. No. 15/161,180, filed 20 May 2016, and entitled "SUBSCRIBER SESSION DIRECTOR," issued as U.S. Pat. No. 10,230,685, the entireties of which application(s) and/or patent(s) are hereby incorporated by reference herein.

TECHNICAL FIELD

The disclosed subject matter relates to improving access point name (APN) domain name service (DNS) query responses, e.g., returning a managed DNS query response based on satisfying a rule related to a criterion and emulation results of an APN DNS query sent to an evolved packet core (EPC) device of an EPC device group.

BACKGROUND

By way of brief background, conventional subscriber steering methods are rudimentary and are built on DNS query and response methods that predate the existence of a mobility packet core. An improved method of steering newly arriving sessions based upon intelligent feedback from the network infrastructure is a necessity for future mobility growth.

When subscribers attach to the network for a data service under conventional systems, a query and response DNS system called APN DNS is in place to direct subscribers to the appropriate network device(s). APNs are application environments that expose subscribers to resources like internet access, an enterprise network, voice over long term evolution (VoLTE) service or other mobility application(s). While APN DNS does perform some simple functions, it generally lacks application-level awareness or intelligence that differentiates the responses to a client attempting to locate a service. APN DNS is typically unaware if congestion is occurring on the network, if an end-to-end service is unavailable, if subscribers are being properly rated, or if the arrival of subscribers will exceed the expected capacity of the candidate targets.

Further, APN DNS can be a cumbersome method of managing candidate targets for new subscriber arrivals. APN DNS generally cannot be used during maintenance activities to remove targets to prevent subscriber attaches. The current method of altering APN DNS entries involves loading, editing and distribution of large files that can take hours and reduce maintenance windows within operations. DNS, because of design, is inherently unaware of the application level readiness for the service to which it responds. This results in the current APN DNS being subject to steering clients to impaired or congested environments because feedback is not received from the network regarding the state of the network or elements comprising the network. As such, newly arriving subscribers can be directed to down networks, impaired networks, or systems that are failing to respond.

Moreover, in modern networks, not all environments serving a subscriber are the same in size or licensed capacity. Conventional DNS typically treats environments as having the same capacity. As a result, conventional DNS will typically round-robin load distribute newly arriving subscribers against all designated target environments and, should they be dissimilar in size, this action may have undesirable consequences, as smaller environments may be overrun or may exhaust subscriber-licensed capacity. Virtualization further compounds these problems because subscriber capacity in a packet core can change dynamically as additional virtualized elements can change quickly in an automated fashion. The dynamic nature of a modern virtualized packet core exacerbates the problems introduced by traditional APN DNS behavior and the limited capabilities associated therewith.

DETAILED DESCRIPTION

Figure 1:
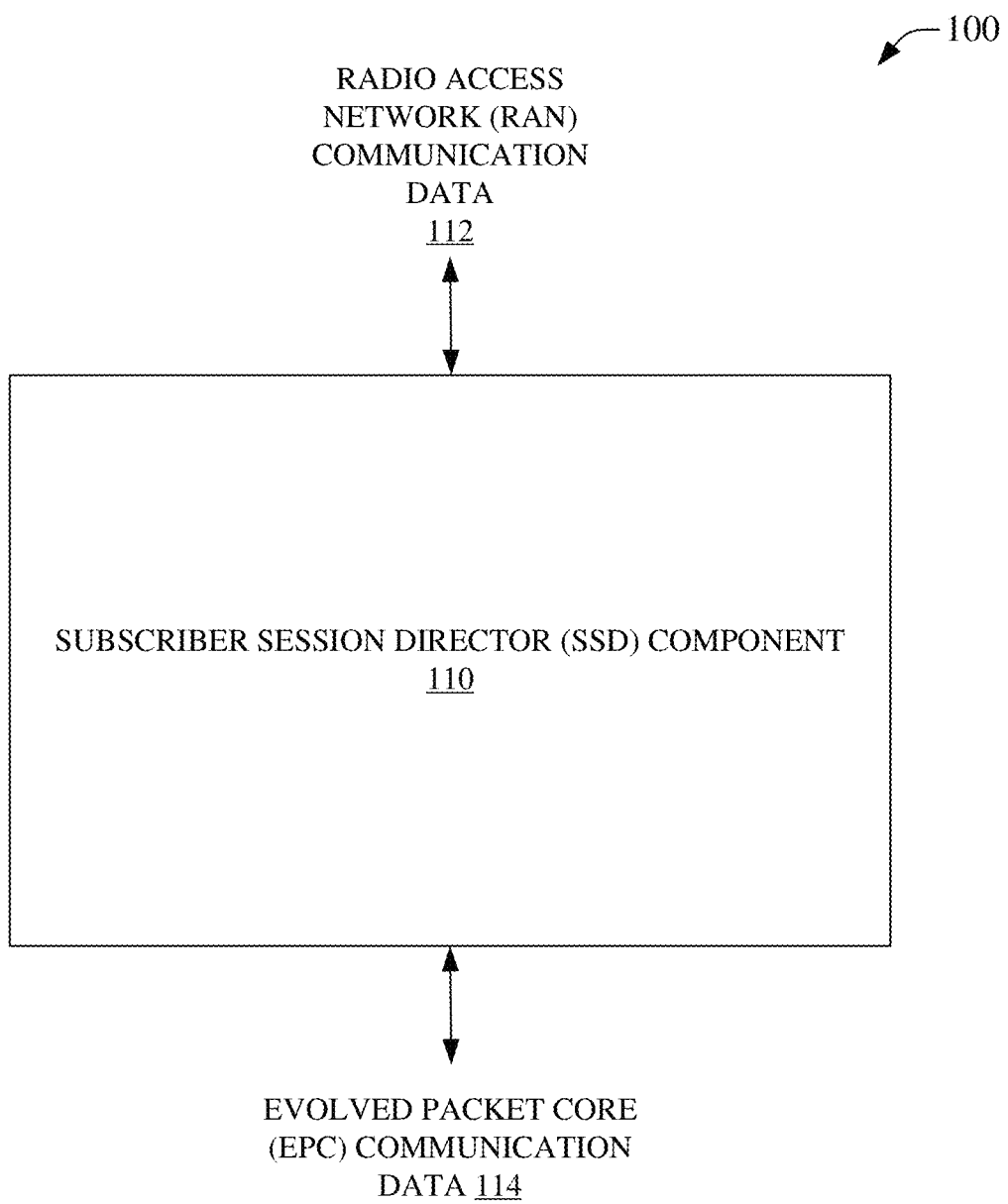
FIG. 1 is an illustration of an example system that facilitates determining a managed DNS query response based on probing an EPC device in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional APN DNS can be considered primitive in view of the ongoing developments in the evolution of networks. Conventional APN DNS typically is ignorant of the state of the network and/or devices comprising the network. As such, conventional APN DNS can simplistically steer connections to a next network device that resolves an APN DNS query regardless of the condition of the network or service associated with that next network device. In short, APN DNS generally lacks application-level awareness or intelligence that differentiates the responses to clients attempting to locate a service. APN DNS is typically unaware if congestion is occurring on the network, if an end-to-end service is unavailable, if subscribers are being properly rated, or if the arrival of subscribers will exceed the expected capacity of the candidate targets. APN DNS generally cannot be used during maintenance activities to remove targets to prevent subscriber attaches. APN DNS can steer clients to impaired or congested environments because APN DNS does not receive feedback from the network regarding the state of the network or elements comprising the network. Moreover, conventional DNS will typically round-robin load distribute newly arriving subscribers against all designated target environments despite dissimilar sizes, which can overrun smaller environments or may exhaust subscriber licensed capacity. Further, the dynamic nature of a modern virtualized packet core exacerbates these problems because subscriber capacity in a packet core can change dynamically as additional virtualized elements can change quickly and in an automated fashion.

In an aspect, intelligent steering based upon available quality of service, available capacity, revenue assurance and the user experience are all possible with enrichments afforded by a Subscriber Session Director (SSD) component. An SSD can enable the introduction or removal of target resources through simple operational commands. An SSD element can appear, to the nodes performing DNS queries, as a traditional APN DNS nameserver device, allowing introduction into existing systems by providing backwards compatibility. Further, responses to APN DNS queries can be adapted to appear as a conventional response but can comprise data representative of capabilities afforded by an SSD component. An SSD can have additional intelligence to facilitate the manipulation of responses to meet one or more technical objectives. An SSD can measure subscriber attach rates to network resources by emulating the subscriber and assessing a network's service level. Adjustments can be made should environments be unavailable, impaired or the potential for revenue loss exists. An SSD can load distribute newly arriving subscriber based upon load factors, arrival capacity for the candidate target environments, etc. An SSD can detect that an outage has occurred and can steer new subscriber attaches around potential outages by suppressing responses for impaired environments. These outages can be detected at the signaling plane, the quality of service (QoS) layer, e.g., via a GTP-C assigned Quality of Service returned during GTP-C signaling, or user-plane application level feedback. An SSD can enable the insertion or removal of packet core elements as candidates for new subscriber attaches in an expedient manner to improve operations and reduce the times associated with maintenance activities.

The approach of using an SSD to direct subscribers to optimized and available network resources can allow a network provider entity to evolve to simultaneously support legacy packet core, virtualized packet cores, and dissimilar vendors that can be favorable to preexisting methods. An SSD can be used in conjunction with legacy APN DNS and additional function(s) transparent to any nodes seeking hostname resolution. An SSD can allow a network provider entity to simultaneously support dissimilar size environments and provide intelligent responses based upon various technical criteria in an extensible way.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates determining a managed DNS query response based on probing an Evolved Packet Core (EPC) device, e.g., the EPC device and/or one or more network resources beyond the EPC device associated with fully resolving an Access Point Name (APN) Domain Name Service (DNS) query or DNS query in accordance with aspects of the subject disclosure. In an aspect, probing the EPC device can be, in some instances, a shorthand term meaning probing a network resource chain associated with resolution of an APN DNS or DNS query in that where a query for a networked resource or network address can be routed via a plurality of network paths, one or more of these paths can be examined to determine associated characteristics that can then be employed in selecting a preferred resolved DNS reply that can designate a network resource, service, or address, and/or a route to connect thereto. For simplicity and clarity, the term APN DNS, as used herein, is typically meant to include both the APN DNS term and the DNS term. In some instances, different EPC devices of a core network can be comprised in the one or more paths to a network resource, service, network address, etc.

System 100 can comprise subscriber session director (SSD) component 110. SSD component 110 can communicate with a radio access network (RAN) device to send or receive RAN communication data 112. In an aspect, RAN communication data 112 can comprise an Access Point Name (APN) Domain Name Service (DNS) query and/or response. An APN DNS query and/or response can be associated with directing subscribers to an appropriate network device(s) related to environments that can expose subscribers to resources like internet access, an enterprise network, voice-over-long-term-evolution (VoLTE) service or other mobility application(s).

SSD component 110, in some aspects, can communicate with one or more EPC devices, with other network devices via one or more EPC devices, etc. This communication can be termed EPC communication data 114. In some embodiments, EPC communication data 114 can comprise sending an APN DNS query and/or returning a response thereto, e.g., conventional resolution of an APN DNS query. In other embodiments, EPC communication data 114 can comprise a communication related to emulating an APN DNS query so as to probe or evaluate various possible resolutions of the APN DNS query in a modern computer network. As an example, where a service is available via a plurality of servers, emulation of the APN DNS query can determine one or more characteristics associated with resolving the APN DNS query to each of the servers comprising the plurality of servers. As such, the emulation can enable selection of a preferred response to the APN DNS query based on a determined characteristic. Therefore, where a service on a first server in the same region as an originator of an APN DNS query is unavailable, slow, costly, unreliable, etc., e.g., determined by SSD component 110 from EPC communication data 114, preference can be given to a resolution for another server, etc. The preferred server can then be indicated in a response to the APN DNS query, e.g., via a return message of RAN communication data 112.

It will be appreciated that where probing of EPC devices, etc., occurs in response to a received APN DNS query, response time can be slowed due to introduction of the time needed to perform the emulation and evaluation of the results of the emulation. However, the increase in time can be associated with real-time selection of a DNS response comprising a preferred resolution of the APN DNS query. As such, the end result can be an improved user experience, despite any increase in response time associated with probing network resources, e.g., an increase in response time to an APN DNS query can be more than offset by the DNS response indicating a server that is faster, more reliable, cheaper, etc., than a server that would have been indicated in a conventional DNS response.

In another aspect, results of APN DNS probing/evaluations can be stored and accessed via SSD component 110. This can increase the response speed of SSD component 110 to a received APN DNS query by enabling the use of historical results in responding to the APN DNS query. As an example, where a UE of a delivery truck driver sends a request for an attach to an APN, e.g., via RAN communication data 112, this can cause SSD component 110 to generate an APN DNS query, seeking a route to an parcel tracking service, and this service is accessible on a Seattle-based server that is running slowly and an Atlanta-based server that is running at normal speed, a probe performed by SSD component 110 can determine that the Atlanta server is preferred. This information can be stored, such that when another delivery truck driver initiates another request for a similar/same attach to an APN, e.g., via another RAN communication data 112, another APN DNS query for the same service can be resolved by SSD component 110, e.g., via the prior results for the Atlanta server information, which can be returned without needing to perform the probe again.

In an aspect, the aforementioned stored results can be associated with a staling or aging value, such that when the results are deemed sufficiently old, a new probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, the ranking can be based on characteristics such as popularity of the query, provisions of an agreement with a subscriber, idle time, etc. As an example, where a first APN DNS query occurs more often than a second APN DNS query, where a probe related to the first query and a probe related to the second query each go stale, the first APN DNS probe can be re-executed before the second APN DNS probe is re-executed. In another example, a contractual agreement with the delivery truck service can be associated with ranking related probes higher than other probes of similar popularity and, as such, re-execution of staled probes for the delivery truck service can be re-executed ahead of staled probes for similarly popular queries that are not associated with the delivery truck service. Where the example SSD component is not idle, re-execution of staled probes can be delayed, such that when the SSD component goes idle, re-execution of staled probes can be resumed. The resumption can be based on the instant rank of staled probes, can resume from where the delay began, etc.

Ranking of APN DNS probes can be associated with the popularity of a service, application, environment, etc., e.g., the frequency with which an APN DNS query for said service, application, environment, etc., is received. In an aspect, evaluation of network conditions and characteristics by SSD component 110 can be related to the popularity of a service, application, environment, etc. As such, preferred DNS responses can be stored and made accessible to SSD component 110 such that SSD component 110 can respond to an APN DNS query for a popular service(s), application(s), environment(s), etc., based on the stored preferred response(s) rather than running a real-time evaluation. In an aspect, a real-time evaluation, e.g., probe, can be forced despite a stored result being available. In an example, the real-time evaluation can be forced based on a user indicated preference, a message from an APN/server of a change in status, in response to an occurrence of a cyber-threat/malware, e.g., detection of a denial of service attack, etc., based on contractual agreements, or nearly any other factor.

In another aspect, SSD component 110 can limit APN DNS query resolution to an EPC group that can comprise one or more EPC device. This can serve to limit resolution of a DNS query to networks comprising the EPC device(s) of the EPC group. As a result, SSD resolution can be segmented into regions associated with the EPC group. As an example, an SSD component 110 in Idaho can limit DNS resolution and/or probing to networks comprising EPC device(s) located West of the Mississippi river while another SSD component 110 in Florida can be limited to DNS resolution and/or probing to networks comprising EPC device(s) located East of the Mississippi river. Embodiments of the presently disclosed subject matter can further add or remove an EPC device to/from an EPC group. This can further enable adjusting the footprint of an EPC group, for example, to expand the example Idaho located SSD component to include some EPC devices East of the Mississippi. Of note, in some embodiments an EPC device can be included in one or more EPC groups. As an example, where an EPC device East of the Mississippi is added to the Idaho EPC group, this same EPC device can be retained in, or removed from, the Florida EPC group.

In an aspect, SSD component 110 can return a DNS result in response to an APN DNS query based on a real-time probe and/or based on historical probes. Where historical probes are employed, SSD component 110 can evaluate an instant APN DNS query against a criterion associated with historical APN DNS probe results. This can enable SSD component 110 to determine a level of similarity between the instant query and historical queries. Where the level of similarity is determined to be sufficient, e.g., satisfying a rule related to the level of similarity, then the results associated with the historically similar results can be employed in responding to the instant APN DNS query. As an example, where a delivery truck driver in Portland initiates an instant query to a package tracking service, and a prior probe was conducted from Seattle and from Cleveland, then the Cleveland results can be excluded based on a lack of similarity and the Seattle probe results can be included based on a sufficient level of similarity. Continuing the example, where another prior probe was performed by a Vancouver, Wash., device, this result can be higher ranked than the Seattle probe based on their both being sufficiently similar to the instant query but that the Vancouver probe is substantially more proximate to the Portland query than the Seattle probe. Other criterion can include, time of day, day of week, location, device type or other device characteristics, subscriber ranking or subscriber agreement(s), age of historical probes, known changes in network conditions, etc.

In some embodiments, SSD component 110 readily allows for returning a response to an APN DNS query based on an intelligent evaluation of network conditions, including congestion occurring on the network, availability of an end-to-end service, subscriber rating, expected capacity of the candidate target(s), maintenance activities, down network(s), impaired network(s), system(s) that are failing to respond, dissimilar environment size/capacity, etc. SSD component 110 allows for real-time and historical network evaluation, e.g., a probe, via emulation of devices performing an APN DNS query. Historical probe results can be stored and compared to an incoming APN DNS query to determine if they are sufficiently similar that a historical DNS response can be employed. Moreover, SSD component 110 can rank historical probes to determine re-execution of staled probes. Additionally, a popularity can be associated with an APN DNS probe such that it can be evaluated and stored in a prophylactic manner, e.g., the probe can be executed and stored in the absence of receiving an actual APN DNS query, allowing a rapid response should a sufficiently similar APN DNS query be received thereafter. It will be noted that all of these aspects are significant improvements to conventional APN DNS resolution.

Figure 2:
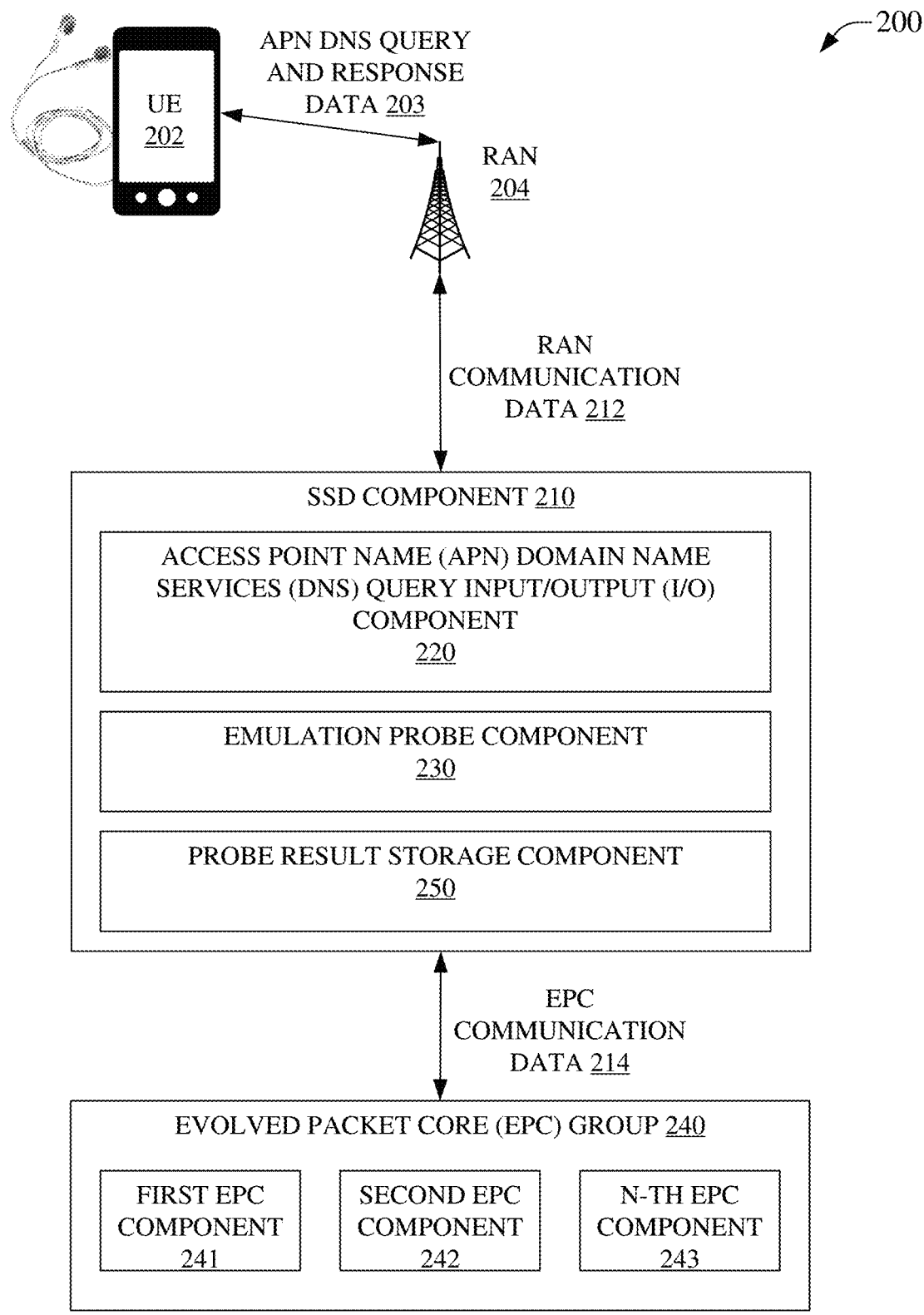
FIG. 2 is a depiction of an example system that facilitates determining a managed DNS query response based on probing a set of EPC devices and storing corresponding probe results in accordance with aspects of the subject disclosure.

FIG. 2 is a depiction of a system 200 that can facilitate determining a managed DNS query response based on probing a set of EPC devices and storing corresponding probe results in accordance with aspects of the subject disclosure. System 200 can comprise SSD component 210. SSD component 210 can communicate with RAN device 204 to send or receive RAN communication data 212. In an aspect, RAN communication data 212 can comprise an APN DNS query and/or response from UE 202. An APN DNS query and/or response can be associated with directing subscribers to an appropriate network device(s) related to environments that can expose subscribers to resources like Internet access, enterprise networks, VoLTE service or other mobility application(s).

SSD component 210, in some aspects, can communicate with EPC group 240 comprising one or more EPC devices, e.g., first EPC component 241, second EPC component 242 . . . , N-th EPC component 243, etc., and/or with other network devices (not illustrated) via said one or more EPC devices 241-243, etc. This communication can be termed EPC communication data 214. In some embodiments, EPC communication data 214 can comprise sending an APN DNS query and/or returning a response thereto, e.g., conventional resolution of an APN DNS query. In other embodiments, EPC communication data 214 can comprise a communication related to emulating an APN DNS query enabling SSD component 210 to probe or evaluate various possible resolutions of the APN DNS query in a modern computer network. Emulation of the APN DNS query can determine one or more characteristics associated with resolving the APN DNS query to each of the servers comprising the plurality of servers. As such, the emulation can enable selection of a preferred response to the APN DNS query based on a determined characteristic. Therefore, where a service is determined by SSD component 210 from EPC communication data 214 to be unavailable, slow, costly, unreliable, etc., preference can be given to a resolution via another server, etc. The preferred server can then be indicated in a response to the APN DNS query, e.g., via a return message to UE 203 via RAN communication data 212 through RAN 204.

Probing of EPC devices, etc., can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable.

SSD component 210 can comprise APN DNS query input/output (I/O) component 220. APN DNS I/O component 220 can parse an APN DNS received as part of RAN communication data 212. The parsed APN DNS query can be evaluated and used to evaluate one or more possible responses to the query. In an aspect, this can occur in a conventional manner in which a next allocation can be returned without analysis of the network. In another aspect, possible responses can be evaluated based on a network characteristic derived from emulating the APN DNS query to one or more endpoint devices. In an embodiment, the results of the emulation can be ranked according to a rule relating to the characteristic to determine a preferred DNS response.

Emulation probe component 230, of SSD component 210, can execute emulation of an APN DNS query. In an aspect, this can comprise probing devices via EPC group 240. The results of an APN DNS to devices comprising EPC group 240 can be analyzed in view of one or more characteristics and the results can be then be ranked. As such, where, for example, the same service is available on two servers, cost, delay, reliability, available capacity, etc., can be determined for access to the service for each server and then ranked. Based on the ranking, SSD component 210 can then include a preferred DNS in a DNS response to UE 202. In some embodiments, a server can be provided by one server but different network paths, e.g., via different EPC components 241 to 243, can result in different characteristics that can be employed in ranking the corresponding DNS responses to allow selection of a preferred DNS response.

In another aspect, results of APN DNS probing/evaluations can be stored and accessed by SSD component 210 via probe result storage component 250. This can increase the response speed of SSD component 210 to a received APN DNS query by enabling the use of historical results in responding to the APN DNS query. As an example, where UE 202 of sends an APN DNS query via RAN 204 to SSD component 210, e.g., via RAN communication data 212, seeking VoLTE service, and this service is accessible on a first server that is running slowly and a second server that is running at normal speed, a probe performed by emulation probe component 230 can determine that the second server is preferred. This information can be stored by probe result storage component 250, such that when another UE initiates an APN DNS query for the same service, the prior results can be accessed by probe result storage component 250 and the second server information can be returned to the other UE, without emulation probe component 230 needing to perform the probe again.

In an aspect, the aforementioned stored results can be stored local to SSD component 210, local to probe result storage component 250, or remote therefrom. In an embodiment, a storage device can be comprised in SSD component 210 or probe result storage component 250 to enable local storage of results. In another embodiment, a storage device can be located remote from either SSD component 210 or probe result storage component 250 to enable remote storage of probe results. Where probe results are stored remotely, it can be presumed that a communicative connection can be formed to allow access to stored data by either SSD component 210 or probe result storage component 250. Moreover, stored probe results can be associated with a staling or aging value, such that when the results are deemed sufficiently old, e.g., a staling rule is determined to be satisfied, etc., a re-execution of the stale probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, a ranking of the stale probe can be based on characteristics such as popularity of the query, provisions of an agreement with a subscriber, idle time, etc. As an example, where a first APN DNS query occurs more often than a second APN DNS query, the first APN DNS probe, once stale, can be re-executed before the second stale APN DNS probe is re-executed. In another example, a contractual agreement with a subscriber can be associated with ranking probes associated with the subscriber as more important than other probes and, as such, re-execution of staled probes for the subscriber can be re-executed ahead of staled probes for other queries that are not associated with the subscriber. SSD component 210 can re-execute staled probes when idle based on the instant rank of staled probes, based on a last probe performed, etc.

Ranking of APN DNS probes can, in some instances, be associated with the popularity of a service, application, environment, etc., e.g., the frequency with which an APN DNS query for said service, application, environment, etc., is received. In an aspect, evaluation of network conditions and characteristics by SSD component 210 can be related to the popularity of a service, application, environment, etc. As such, preferred DNS responses can be stored/refreshed with a higher priority such that they can be more readily made accessible to SSD component 210 via probe result storage component 250 than less popular APN DNS queries. In these instances, less popular APN DNS queries can be relegated to real-time probing and/or to conventional DNS responses. As such, responses to an APN DNS query for popular service(s), application(s), environment(s), etc., can based on stored preferred responses rather than running a real-time evaluation for these popular APN DNS queries. In an aspect, a real-time evaluation, e.g., probe, can be forced despite a stored result being available. In some embodiments, the popularity of a service, application, environment, etc., can be based on metrics other than a frequency of receiving an APN DNS query. As an example, a preferred service, such as designated by a business relationship, can have probes associated with those service preferentially refreshed as if they were a more popular service.

In another aspect, SSD component 210 can limit APN DNS query resolution to an EPC group 240 that can comprise one or more EPC device 241-243. This can serve to limit resolution of a DNS query to networks comprising EPC device(s) 241-243 of EPC group 240. As a result, SSD resolution can be segmented into regions associated with EPC group 240. Embodiments of the presently disclosed subject matter can further add or remove an EPC device to/from EPC group 240. This can further enable adjusting the footprint of EPC group 240. Of note, in some embodiments an EPC device, e.g., 241-243, etc., can be included in one or more EPC groups, e.g., 240, etc.

In an aspect, SSD component 210 can return a DNS result in response to an APN DNS query based on a real-time probe, via emulation probe component 230, and/or based on historical probes. Where historical probes are employed, SSD component 210 can evaluate an instant APN DNS query, via APN DNS query I/O component 220, against a criterion associated with historical APN DNS probe results that can be accessed via probe result storage component 250. This can enable SSD component 210 to determine a level of similarity between the instant query and historical queries. Where the level of similarity is determined to be sufficient, e.g., satisfying a rule related to the level of similarity, then the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, SSD component 210 readily allows for returning a response to an APN DNS query based on an intelligent evaluation of network conditions, including congestion occurring on the network, availability of end-to-end service(s), subscriber rating, expected capacity of the candidate target(s), maintenance activities, down network(s), impaired network(s), system(s) that are failing to respond, dissimilar environment size/capacity, etc. SSD component 210 allows for real-time and historical newton evaluation, e.g., a probe, via emulation of devices performing an APN DNS query. Historical probe results can be stored and compared to an incoming APN DNS query to determine if they are sufficiently similar that a historical DNS response can be employed. Moreover, SSD component 210 can rank historical probes to determine re-execution of staled probes. Additionally, a popularity can be associated with an APN DNS probe such that it can be evaluated and stored in a prophylactic manner, e.g., the probe can be executed and stored in the absence of receiving an actual APN DNS query, allowing a rapid response should a sufficiently similar APN DNS query be received thereafter. It will be noted that all of these aspects are significant improvements to conventional APN DNS resolution.

Figure 3:
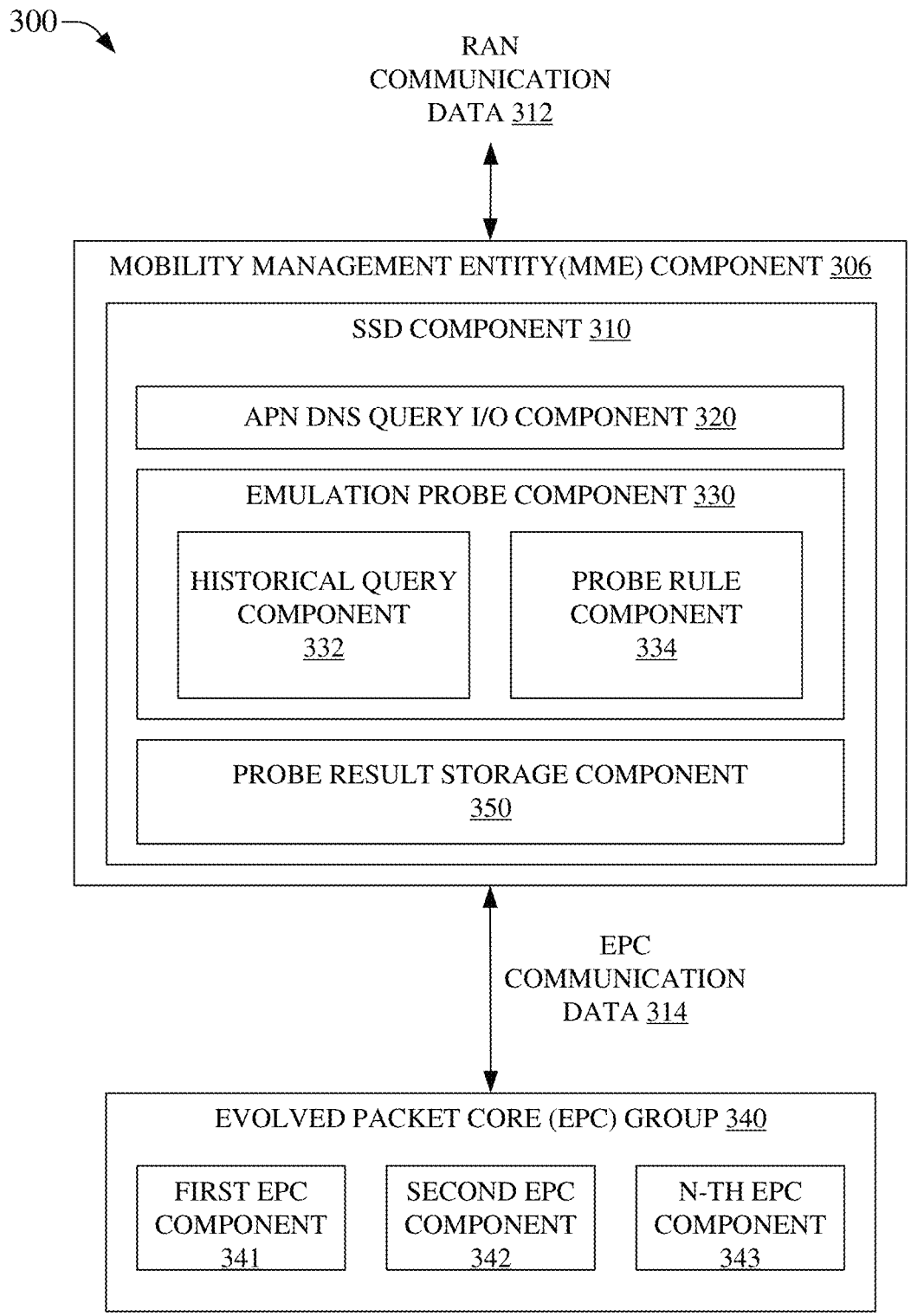
FIG. 3 illustrates an example system that facilitates determining a managed DNS query response based on probing a set of EPC devices based on a historical APN DNS query and storing corresponding probe results in accordance with aspects of the subject disclosure.

FIG. 3 illustrates a system 300 that facilitates determining a managed DNS query response based on probing a set of EPC devices based on a historical APN DNS query and storing corresponding probe results in accordance with aspects of the subject disclosure. System 300 can comprise mobility management entity (MME) component 306. MME component 306 can be a control-node for a LTE access-network. MME component 306 can comprise SSD component 310. SSD component 310 can communicate, via MME component 306, with a RAN device to send or receive RAN communication data 312. In an aspect, RAN communication data 312 can comprise an APN DNS query and/or response from a UE. An APN DNS query and/or response can be associated with directing mobile network subscribers to an appropriate network device(s) that can be related to environments that can expose subscribers to resources like internet access, enterprise networks, VoLTE service or other mobility application(s).

SSD component 310 can communicate with EPC group 340 comprising one or more EPC devices, e.g., first EPC component 341, second EPC component 342 . . . , N-th EPC component 343, etc., and/or with other network devices (not illustrated) via said one or more EPC devices 341-343, etc. This communication can be termed EPC communication data 314. In some embodiments, EPC communication data 314 can comprise sending an APN DNS query and/or returning a response thereto, e.g., conventional resolution of an APN DNS query. In other embodiments, EPC communication data 314 can comprise a communication related to emulating an APN DNS query enabling SSD component 310 to probe or evaluate various possible resolutions of the APN DNS query in a modern computer network. Emulation of the APN DNS query can determine one or more characteristics associated with resolving the APN DNS query to each of the servers comprising the plurality of servers. As such, the emulation can enable selection of a preferred response to the APN DNS query based on a determined characteristic. Therefore, where a service is determined by SSD component 310 from EPC communication data 314 to be unavailable, slow, costly, unreliable, etc., preference can be given to a resolution via another server, etc. The preferred server can then be indicated in a response to the APN DNS query, e.g., via a return message to UE via RAN communication data 312.

Probing of EPC devices, etc., can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable.

SSD component 310 can comprise APN DNS query I/O component 320. APN DNS query I/O component 320 can parse an APN DNS received as part of RAN communication data 312. The parsed APN DNS query can be evaluated and used to evaluate one or more possible responses to the query. In an aspect, this can occur in a conventional manner in which a next allocation can be returned without analysis of the network. In another aspect, possible responses can be evaluated based on a network characteristic derived from emulating the APN DNS query to one or more endpoint devices. In an embodiment, the results of the emulation can be ranked according to a rule relating to the characteristic to determine a preferred DNS response.

Emulation probe component 330, of SSD component 310, can execute emulation of an APN DNS query. In an aspect, this can comprise probing devices via EPC group 340. The results of an APN DNS to devices comprising EPC group 340 can be analyzed in view of one or more characteristics and the results can be then be ranked. Emulation probe component 330 can comprise historical query component 332 and probe rule component 334. Historical query component 332 can track received APN DNS queries. In an aspect, this can enable recognition of an instant APN DNS query against a similar historical APN DNS query. Where a prior similar (or same) APN DNS query has been received, emulation probe component 330 can indicate that stored results be sought, e.g., via probe result storage component 350. Moreover, tracking of received APN DNS queries can enable analysis of said queries to determine, for example, popular queries, periodicity of recurring queries, etc. As an example, where an first APN DNS query is matched to a historic query and the corresponding stored DNS reply is returned, a subsequent repeat query from the same UE received shortly after the return of the stored DNS response can indicate that the user was dissatisfied with the prior returned DNS response. This can cause emulation probe component 330 to perform a real-time probe upon receipt of the subsequent repeat query to avoid resending the stored DNS response that may have been unsatisfactory to the user. Moreover, the results of the real-time probe can be employed to update the stored DNS response for the query regardless of the staling state of the stored DNS response.

In an aspect, probe rule component 334 can apply a probe rule to an emulation of an APN DNS query performed by emulation probe component 330. A probe rule can be employed to constrain the emulation. As an example, a probe rule can limit the emulation to those that are responsive within a predetermined time limit such that slow responding emulations are truncated prior to completion. In another example, emulations can be cost limited, such that emulations transitioning a determined cost are truncated or never executed. In a further example, white lists and black lists can be applied via probe rule component 334, e.g., white list endpoint device can always be included in relevant emulations, while black list endpoint devices can always be excluded from relevant emulations. Similarly, regional and national borders can be enforced, e.g., an emulation can be limited to endpoint devices in the USA, in Canada, in Virginia, etc. In embodiments, the rules can relate to subscriber profile settings, carrier settings, contractual obligations, etc.

In another aspect, results of APN DNS probing/evaluations can be stored and accessed by SSD component 310 via probe result storage component 350. This can increase the response speed of SSD component 310 to a received APN DNS query by enabling the use of historical results in responding to the APN DNS query. As an example, an APN DNS query seeking VoLTE service accessible on a first server that is running slowly and a second server that is running at normal speed can result in a DNS response that indicates that the second server is preferred. This information can be stored by probe result storage component 350, such that when another UE initiates an APN DNS query for the same/similar service, as indicated by historical query component 332, and satisfies any rule applied by probe rule component 334, the prior results can be accessed by probe result storage component 350 and the second server information can be returned to the other UE, without emulation probe component 330 needing to perform the probe again.

In an aspect, the aforementioned stored results can be stored local to SSD component 310, local to probe result storage component 350, or remote therefrom. In an embodiment, a storage device can be comprised in SSD component 310 or probe result storage component 350 to enable local storage of results. In another embodiment, a storage device can be located remote from either SSD component 310 or probe result storage component 350 to enable remote storage of probe results. Where probe results are stored remotely, a communicative connection can be formed to allow access to stored data by either SSD component 310 or probe result storage component 350. Moreover, stored probe results can be associated with a staling or aging value, such that when the results are deemed sufficiently old, e.g., a staling rule is determined to be satisfied, etc., a refreshing of the stale probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, a ranking of the stale probe can be based on characteristics such as popularity of the query, provisions of an agreement with a subscriber, idle time, etc. SSD component 310 can re-execute staled probes when idle based on the instant rank of staled probes, based on a last probe performed, etc.

Ranking of APN DNS probes can, in some instances, be associated with the popularity of a service, application, environment, etc., e.g., the frequency with which an APN DNS query for said service, application, environment, etc., is received. In an aspect, evaluation of network conditions and characteristics by SSD component 310 can be related to the popularity of a service, application, environment, etc. As such, preferred DNS responses can be stored/refreshed with a higher priority such that they can be more readily made accessible to SSD component 310 via probe result storage component 350 than less popular APN DNS queries. In these instances, less popular APN DNS queries can be relegated to real-time probing and/or to conventional DNS responses. As such, responses to an APN DNS query for popular service(s), application(s), environment(s), etc., can be based on stored preferred responses rather than running a real-time evaluation for these popular APN DNS queries. In an aspect, a real-time evaluation, e.g., probe, can be forced despite a stored result being available. In some embodiments, the popularity of a service, application, environment, etc., can be based on metrics other than a frequency of receiving an APN DNS query.

In another aspect, SSD component 310 can limit APN DNS query resolution to an EPC group 340 that can comprise one or more EPC device 341-343. This can serve to limit resolution of a DNS query to networks comprising EPC device(s) 341-343 of EPC group 340. As a result, SSD resolution can be segmented into regions associated with EPC group 340. Embodiments of the presently disclosed subject matter can further add or remove an EPC device to/from EPC group 340. This can further enable adjusting the footprint of EPC group 340. Of note, in some embodiments an EPC device, e.g., 341-343, etc., can be included in one or more EPC groups, e.g., 340, etc.

In an aspect, SSD component 310 can return a DNS result in response to an APN DNS query based on a real-time probe, via emulation probe component 330, and/or based on historical probes. Where historical probes are employed, SSD component 310 can evaluate an instant APN DNS query, via APN DNS query I/O component 320, against a criterion associated with historical APN DNS probe results, via historical query component 332, which can be accessed via probe result storage component 350. This can enable historical query component 332 to determine a level of similarity between the instant query and historical queries. Where the level of similarity is determined to be sufficient, e.g., satisfying a rule related to the level of similarity, the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, SSD component 310 readily allows for returning a response to an APN DNS query based on an intelligent evaluation of network conditions, including congestion occurring on the network, availability of end-to-end service(s), subscriber rating, expected capacity of the candidate target(s), maintenance activities, down network(s), impaired network(s), systems that are failing to respond, dissimilar environment size/capacity, etc. SSD component 310 allows for real-time and historical newton evaluation, e.g., a probe, via emulation of devices performing an APN DNS query. Historical probe results can be stored and compared to an incoming APN DNS query to determine if they are sufficiently similar that a historical DNS response can be employed. Moreover, SSD component 310 can rank historical probes to determine re-execution of staled probes. Additionally, a popularity can be associated with an APN DNS probe such that it can be evaluated and stored in a prophylactic manner, e.g., the probe can be executed and stored in the absence of receiving an actual APN DNS query, allowing a rapid response should a sufficiently similar APN DNS query be received thereafter. It will be noted that all of these aspects are significant improvements to conventional APN DNS resolution.

Figure 4:
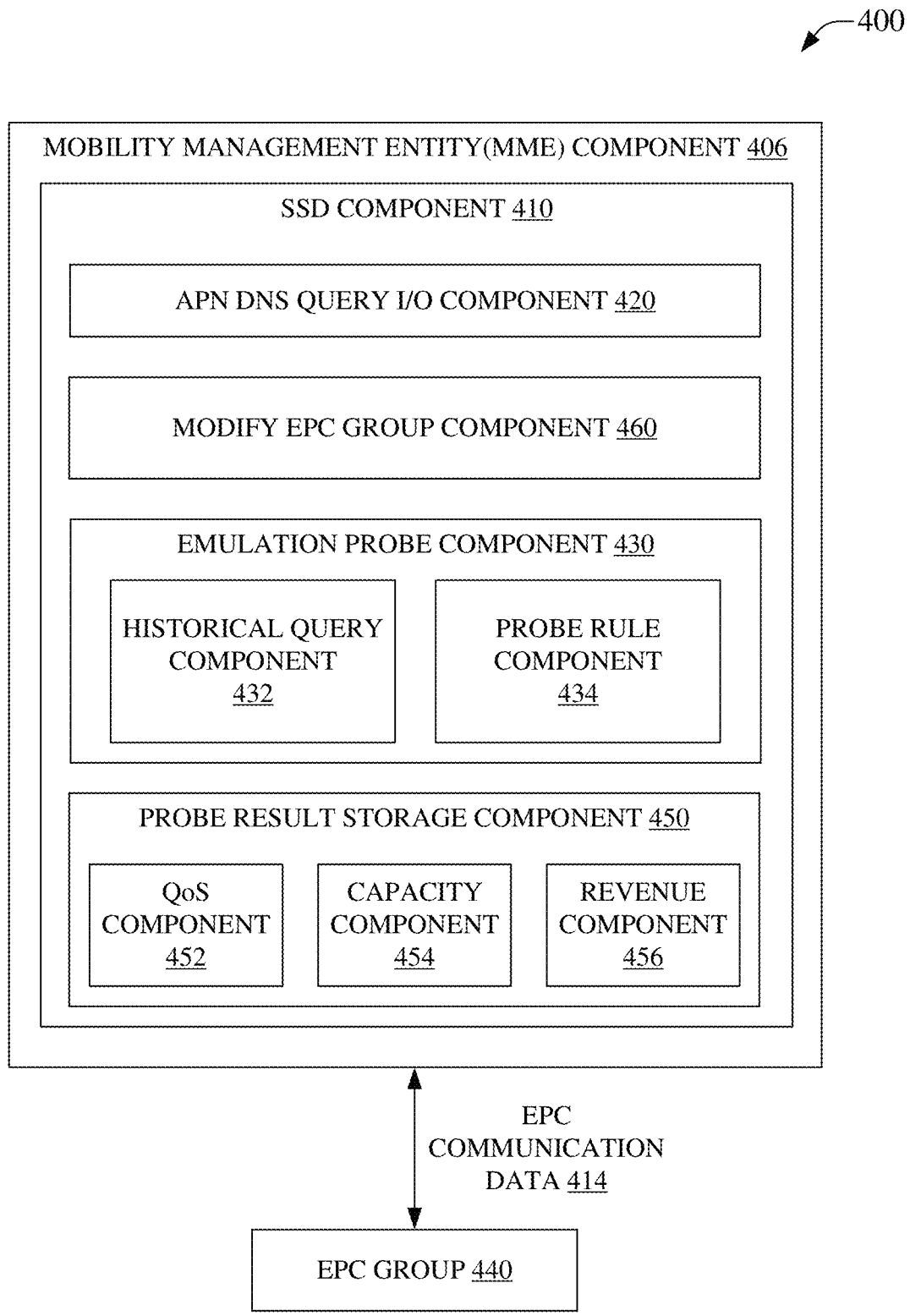
FIG. 4 illustrates an example system that facilitates determining a managed DNS query response based on probing a modified set of EPC devices based on a historical APN DNS query and storing corresponding probe results in accordance with aspects of the subject disclosure.

FIG. 4 illustrates a system 400 that facilitates determining a managed DNS query response based on probing a modified set of EPC devices based on a historical APN DNS query and storing corresponding probe results in accordance with aspects of the subject disclosure. System 400 can comprise MME component 406. MME component 406 can be a control-node for a LTE access-network. MME component 406 can comprise SSD component 410. SSD component 410 can communicate, via MME component 406, with a RAN device to send or receive RAN communication data 412. In an aspect, RAN communication data 412 can comprise an APN DNS query and/or response from a UE. An APN DNS query and/or response can be associated with directing mobile network subscribers to an appropriate network device(s) that can be related to environments that can expose subscribers to resource(s) like internet access, enterprise networks, VoLTE service or other mobility application(s).

SSD component 410 can communicate with EPC group 440 comprising one or more EPC devices, and/or with other network devices (not illustrated) via said one or more EPC devices. This communication can be termed EPC communication data 414. In some embodiments, EPC communication data 414 can comprise sending an APN DNS query and/or returning a response thereto, e.g., conventional resolution of an APN DNS query. In other embodiments, EPC communication data 414 can comprise a communication related to emulating an APN DNS query enabling SSD component 410 to probe or evaluate various possible resolutions of the APN DNS query in a modern computer network. Emulation of the APN DNS query can determine one or more characteristics associated with resolving the APN DNS query to each of the servers comprising the plurality of servers. As such, the emulation can enable selection of a preferred response to the APN DNS query based on a determined characteristic. Therefore, where a service is determined by SSD component 410 from EPC communication data 414 to be unavailable, slow, costly, unreliable, etc., preference can be given to a resolution via another server, etc. The preferred server can then be indicated in a response to the APN DNS query, e.g., via a return message to the UE via RAN communication data 412.

Probing of EPC devices, etc., can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable.

SSD component 410 can comprise APN DNS query I/O component 420. APN DNS query I/O component 420 can parse an APN DNS received as part of RAN communication data 412. The parsed APN DNS query can be evaluated and used to evaluate one or more possible responses to the query. In an aspect, this can occur in a conventional manner in which a next allocation can be returned without analysis of the network. In another aspect, possible responses can be evaluated based on a network characteristic derived from emulating the APN DNS query to one or more endpoint devices. In an embodiment, the results of the emulation can be ranked according to a rule relating to the characteristic to determine a preferred DNS response.

Emulation probe component 430, of SSD component 410, can execute emulation of an APN DNS query. In an aspect, this can comprise probing devices associated with EPC group 440. The results of an APN DNS query to devices associated with EPC group 440 can be analyzed in view of one or more characteristics and the results can be then be ranked. Emulation probe component 430 can comprise historical query component 432 and probe rule component 434. Historical query component 432 can track received APN DNS queries. In an aspect, this can enable recognition of an instant APN DNS query against a similar historical APN DNS query. Where a prior similar (or same) APN DNS query has been received, emulation probe component 430 can indicate that stored results be accessed, e.g., via probe result storage component 450. Moreover, tracking of received APN DNS queries can enable analysis of said queries to determine, for example, popular queries, periodicity of recurring queries, etc. As an example, where a first APN DNS query is matched to a historic query and the corresponding stored DNS reply is returned, a subsequent repeat query from the same UE received shortly after the return of the stored DNS response can indicate that the prior returned DNS response was unsatisfactory. This can cause emulation probe component 430 to perform a real-time probe upon receipt of the subsequent repeat query to avoid resending the stored DNS response in a subsequent DNS response. Moreover, the results of the real-time probe can be employed to update a stored DNS response for the query regardless of the staling state of the stored DNS response.

In an aspect, probe rule component 434 can apply a probe rule to an emulation of an APN DNS query performed by emulation probe component 430. A probe rule can be employed to constrain the emulation. As an example, a probe rule can limit the emulation to those that are responsive within a predetermined time limit such that slow responding emulations are truncated prior to completion. In another example, emulations can be cost limited, such that emulations transitioning a determined cost are truncated or never executed. In a further example, white lists and black lists can be applied via probe rule component 434, e.g., white list endpoint device can always be included in relevant emulations, while black list endpoint devices can always be excluded from relevant emulations. Similarly, regional and national borders can be enforced, e.g., emulation can be limited to endpoint devices in the USA, in Ohio, in Dade County, in Charlotte N.C., etc. In embodiments, the rules can relate to subscriber profile settings, carrier settings, contractual obligations, etc.

In another aspect, results of APN DNS probing/evaluations can be stored and accessed by SSD component 410 via probe result storage component 450. This can increase the response speed of SSD component 410 to a received APN DNS query by enabling the use of historical results in responding to the APN DNS query. In an embodiment, probe result storage component 450 can comprise quality of service (QoS) component 452 that can evaluate a QoS for a possible DNS resolution. The determined QoS can be employed to determine a preferred DNS resolution, such that said DNS resolution can be returned via a DNS response to the APC DNS query. As an example, an APN DNS query seeking internet service accessible on a first gateway that is running slowly, e.g., a low QoS, and a second gateway that is running at normal speed, e.g., a normal QoS, can result in a DNS response that indicates that the second gateway is preferred based on the respective QoS metrics.

In another embodiment, probe result storage component 450 can comprise capacity component 454 that can evaluate a capacity of a possible DNS resolution. The determined capacity can be employed to determine a preferred DNS resolution, such that said DNS resolution can be returned via a DNS response to the APC DNS query. As an example, an APN DNS query seeking VoLTE service accessible on a first server that is determined to have no additional capacity and a second server that has additional subscriber capacity, can result in a DNS response that indicates that the second server is preferred based on the respective capacity metrics.

In a further embodiment, probe result storage component 450 can comprise revenue component 456 that can evaluate a cost for use of, or a revenue to be earned via, a possible DNS resolution. The determined cost/revenue metric can be employed to determine a preferred DNS resolution, such that said DNS resolution can be returned via a DNS response to the APC DNS query. As an example, an APN DNS query seeking streaming video service accessible on a first server that is determined to provide no additional revenue to a network carrier and a second server that provides a fee, e.g., revenue, to the network carrier for each provided subscriber attachment, can result in a DNS response that indicates that the second server is preferred based on the respective cost/revenue metrics.

Information from the probe result storage component 450, including information from QoS component 452, capacity component 454, and revenue component 456, can be stored by probe result storage component 450, such that when another UE initiates an APN DNS query for the same/similar service, as indicated by historical query component 432, and satisfies any rule applied by probe rule component 434, the prior results can be accessed by probe result storage component 450 and the second gateway information can be returned to the other UE, without emulation probe component 430 needing to perform the probe again.

In an aspect, the aforementioned stored results can be stored local to SSD component 410, local to probe result storage component 450, or remote therefrom. In an embodiment, a storage device can be comprised in SSD component 410 or probe result storage component 450 to enable local storage of results. In another embodiment, a storage device can be located remote from either SSD component 410 or probe result storage component 450 to enable remote storage of probe results. Where probe results are stored remotely, a communicative connection can be formed to allow access to stored data by either SSD component 410 or probe result storage component 450. Moreover, stored probe results can be associated with a staling or aging value, such that when the results are deemed sufficiently old, e.g., a staling rule is determined to be satisfied, etc., a refreshing of the stale probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a refresh of the probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, a ranking of the stale probe can be based on characteristics such as popularity of the query, provisions of an agreement with a subscriber, idle time, etc. SSD component 410 can re-execute staled probes when idle based on the instant rank of staled probes, based on a last probe performed, etc.

Ranking of APN DNS probes can, in some instances, be associated with the popularity of a service, application, environment, etc., e.g., the frequency with which an APN DNS query for said service, application, environment, etc., is received. In an aspect, evaluation of network conditions and characteristics by SSD component 410 can be related to the popularity of a service, application, environment, etc. As such, preferred DNS responses can be stored/refreshed with a higher priority such that they can be more readily made accessible to SSD component 410 via probe result storage component 450 than less popular APN DNS queries. In these instances, less popular APN DNS queries can be relegated to real-time probing and/or to conventional DNS responses. As such, responses to an APN DNS query for popular service(s), application(s), environment(s), etc., can be based on stored preferred response(s) rather than running a real-time evaluation for these popular APN DNS queries. In an aspect, a real-time evaluation, e.g., probe, can be forced despite a stored result being available. In some embodiments, the popularity of a service, application, environment, etc., can be based on metrics other than a frequency of receiving an APN DNS query.

In another aspect, SSD component 410 can limit APN DNS query resolution to EPC group 440. This can serve to limit resolution of a DNS query to networks having devices comprised in EPC group 440. As a result, SSD resolution can be segmented into regions associated with EPC group 440. In an aspect, SSD component 410 can comprise modify EPC group component 460 that can add or remove an EPC device or other device to/from EPC group 440. This can further enable adjusting the footprint of EPC group 440. Of note, in some embodiments an EPC device can be included in one or more EPC groups, e.g., 440, etc. Modification of EPC group membership can be directed by SSD component 410 in response to determinations made thereby, e.g., satisfying a rule related to EPC group membership, in response to commands received from other devices and/or operators associated with an operator of SSD component 410, in response to information contained in the APN DNS query, etc. As an example, a rule can cause additional devices to be added to EPC group 440 where no satisfactory DNS response can be determined from the existing members of EPC group 440. As another example, an APN DNS query can designate specific devices to be included in EPC group 440. As a further example, a network service provider can explicitly exclude a device such that it cannot be added to EPC group 440. Numerous other examples will be readily appreciated but are not included herein for the sake of clarity and brevity, although all such examples are intended to explicitly fall within the scope of the present disclosure.

In an aspect, SSD component 410 can return a DNS result in response to an APN DNS query based on a real-time probe, via emulation probe component 430, and/or based on historical probes. Where historical probes are employed, SSD component 410 can evaluate an instant APN DNS query, via APN DNS query I/O component 420, against a criterion associated with historical APN DNS probe results, via historical query component 432 that can be accessed via probe result storage component 450. This can enable historical query component 432 to determine a level of similarity between the instant query and historical queries. Where the level of similarity is determined to be sufficient, e.g., satisfying a rule related to the level of similarity, then the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, SSD component 410 readily allows for returning a response to an APN DNS query based on an intelligent evaluation of network conditions, including congestion occurring on the network, availability of end-to-end service(s), subscriber rating, expected capacity of the candidate target(s), maintenance activities, down network(s), impaired network(s), system(s) that are failing to respond, dissimilar environment size/capacity, etc. SSD component 410 allows for real-time and historical newton evaluation, e.g., a probe, via emulation of devices performing an APN DNS query. Historical probe results can be stored and compared to an incoming APN DNS query to determine if they are sufficiently similar that a historical DNS response can be employed. Moreover, SSD component 410 can rank historical probes to determine re-execution of staled probes. Additionally, a popularity can be associated with an APN DNS probe such that it can be evaluated and stored in a prophylactic manner, e.g., the probe can be executed and stored in the absence of receiving an actual APN DNS query, allowing a rapid response should a sufficiently similar APN DNS query be received thereafter. It will be noted that all of these aspects are significant improvements to conventional APN DNS resolution.

Figure 5:
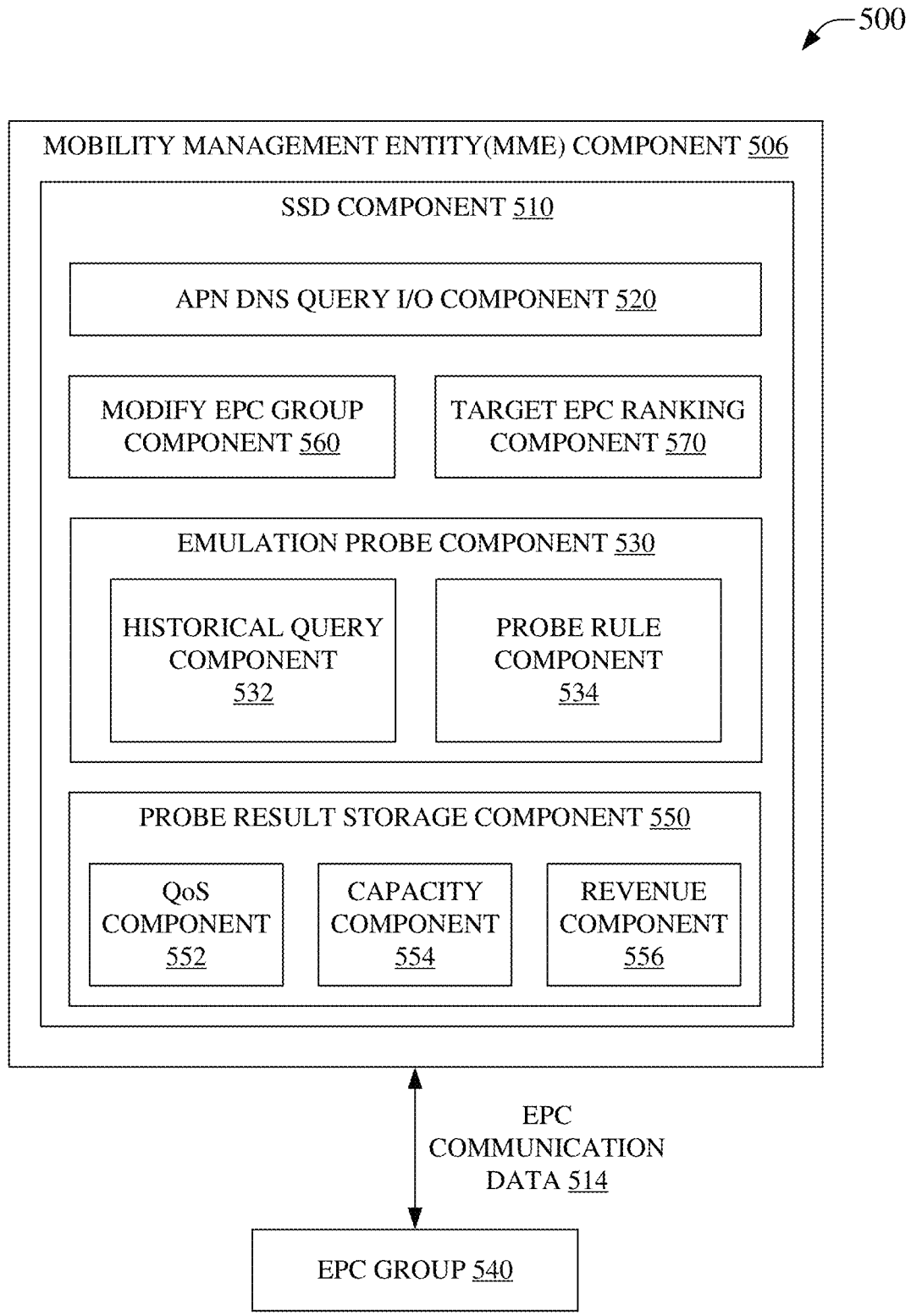
FIG. 5 illustrates an example system depicting determining a managed DNS query response based on probing a set of EPC devices based on a ranked historical APN DNS query and storing corresponding probe results in accordance with aspects of the subject disclosure.

FIG. 5 illustrates a system 500 that facilitates determining a managed DNS query response based on probing a set of EPC devices based on a ranked historical APN DNS query and storing corresponding probe results in accordance with aspects of the subject disclosure. System 500 can comprise MME component 506. MME component 506 can be a control-node for a LTE access-network. MME component 506 can comprise SSD component 510. SSD component 510 can communicate, via MME component 506, with a RAN device to send or receive RAN communication data. In an aspect, RAN communication data can comprise an APN DNS query and/or response from a UE. An APN DNS query and/or response can be associated with directing mobile network subscribers to an appropriate network device(s) that can be related to environments that can expose subscribers to resources like internet access, enterprise networks, VoLTE service or other mobility application(s).

SSD component 510 can communicate with EPC group 540 comprising one or more EPC devices (not illustrated), and/or with other network devices (not illustrated) via said one or more EPC devices. This communication can be termed EPC communication data 514. In some embodiments, EPC communication data 514 can comprise sending an APN DNS query and/or returning a response thereto, e.g., conventional resolution of an APN DNS query. In other embodiments, EPC communication data 514 can comprise a communication related to emulating an APN DNS query enabling SSD component 510 to probe or evaluate various possible resolutions of the APN DNS query in a modern computer network. Emulation of the APN DNS query can determine one or more characteristics associated with resolving the APN DNS query to each of the servers comprising the plurality of servers. As such, the emulation can enable selection of a preferred response to the APN DNS query based on a determined characteristic. Therefore, where a service is determined by SSD component 510 from EPC communication data 514 to be unavailable, slow, costly, unreliable, etc., preference can be given to a resolution via another server, etc. The preferred server can then be indicated in a response to the APN DNS query, e.g., via a return message to the UE via RAN communication data.

Probing of EPC devices, etc., can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable.

SSD component 510 can comprise APN DNS query I/O component 520. APN DNS query I/O component 520 can parse an APN DNS received as part of RAN communication data. The parsed APN DNS query can be evaluated and used to evaluate one or more possible responses to the query. In an aspect, this can occur in a conventional manner in which a next allocation can be returned without analysis of the network. In another aspect, possible responses can be evaluated based on a network characteristic derived from emulating the APN DNS query to one or more endpoint devices. In an embodiment, the results of the emulation can be ranked according to a rule relating to the characteristic to determine a preferred DNS response.

Emulation probe component 530, of SSD component 510, can execute emulation of an APN DNS query. In an aspect, this can comprise probing devices associated with EPC group 540. The results of an APN DNS query to devices associated with EPC group 540 can be analyzed in view of one or more characteristics and the results can be then be ranked. Emulation probe component 530 can comprise historical query component 532 and probe rule component 534. Historical query component 532 can track received APN DNS queries. In an aspect, this can enable recognition of an instant APN DNS query against a similar historical APN DNS query. Where a prior similar (or same) APN DNS query has been received, emulation probe component 530 can indicate that stored results be accessed, e.g., via probe result storage component 550. Moreover, tracking of received APN DNS queries can enable analysis of said queries to determine, for example, popular queries, periodicity of recurring queries, etc. As an example, where a first APN DNS query is matched to a historic query and the corresponding stored DNS reply is returned, a subsequent repeat query from the same UE received shortly after the return of the stored DNS response can indicate that the prior returned DNS response was unsatisfactory. This can cause emulation probe component 530 to perform a real-time probe upon receipt of the subsequent repeat query to avoid resending the stored DNS response in a subsequent DNS response. Moreover, the results of the real-time probe can be employed to update a stored DNS response for the query regardless of the staling state of the stored DNS response.

In an aspect, probe rule component 534 can apply a probe rule to an emulation of an APN DNS query performed by emulation probe component 530. A probe rule can be employed to constrain the emulation. As an example, a probe rule can limit the emulation to those that are responsive within a predetermined time limit such that slow responding emulations are truncated prior to completion. In another example, emulations can be cost limited, such that emulations transitioning a determined cost are truncated or never executed. In a further example, white lists and black lists can be applied via probe rule component 534, e.g., white list endpoint device can always be included in relevant emulations, while black list endpoint devices can always be excluded from relevant emulations. Similarly, regional and national borders can be enforced, e.g., emulation can be limited to endpoint devices in the USA, in Ohio, in Dade County, in Charlotte N.C., etc. In embodiments, the rules can relate to subscriber profile settings, carrier settings, contractual obligations, etc.

In another aspect, results of APN DNS probing/evaluations can be stored and accessed by SSD component 510 via probe result storage component 550. This can increase the response speed of SSD component 510 to a received APN DNS query by enabling the use of historical results in responding to the APN DNS query. In an embodiment, probe result storage component 550 can comprise quality of service (QoS) component 552 that can evaluate a QoS for a possible DNS resolution. The determined QoS can be employed to determine a preferred DNS resolution, such that said DNS resolution can be returned via a DNS response to the APC DNS query. As an example, an APN DNS query seeking internet service accessible on a first gateway that loses a connection more frequently, e.g., a low QoS, than a second gateway, e.g., a normal QoS, can result in a DNS response that indicates that the second gateway is preferred based on the respective QoS metrics.

In another embodiment, probe result storage component 550 can comprise capacity component 554 that can evaluate a capacity of a possible DNS resolution. The determined capacity can be employed to determine a preferred DNS resolution, such that said DNS resolution can be returned via a DNS response to the APN DNS query. As an example, an APN DNS query seeking VoLTE service accessible on a first server that is determined to have no additional capacity and a second server that has additional subscriber capacity, can result in a DNS response that indicates that the second server is preferred based on the respective capacity metrics.

In a further embodiment, probe result storage component 550 can comprise revenue component 556 that can evaluate a cost for use of, or a revenue to be earned via, a possible DNS resolution. The determined cost/revenue metric can be employed to determine a preferred DNS resolution, such that said DNS resolution can be returned via a DNS response to the APC DNS query. As an example, an APN DNS query seeking streaming video service accessible on a first server that is determined to cost a network carrier a larger fee than and a second, can result in a DNS response that indicates that the second server is preferred based on the respective cost/revenue metrics.

Information from the probe result storage component 550, including information from QoS component 552, capacity component 554, and revenue component 556, can be stored by probe result storage component 550, such that when another UE initiates an APN DNS query for the same/similar service, as indicated by historical query component 532, and satisfies any rule applied by probe rule component 534, the prior results can be accessed by probe result storage component 550 and the second gateway information can be returned to the other UE, without emulation probe component 530 needing to perform the probe again.

In an aspect, the aforementioned stored results can be stored local to SSD component 510, local to probe result storage component 550, or remote therefrom. In an embodiment, a storage device can be comprised in SSD component 510 or probe result storage component 550 to enable local storage of results. In another embodiment, a storage device can be located remote from either SSD component 510 or probe result storage component 550 to enable remote storage of probe results. Where probe results are stored remotely, a communicative connection can be formed to allow access to stored data by either SSD component 510 or probe result storage component 550. Moreover, stored probe results can be associated with a staling or aging value, such that when the results are deemed sufficiently old, e.g., a staling rule is determined to be satisfied, etc., a refreshing of the stale probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a refresh of the probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, a ranking of the stale probe can be based on characteristics such as popularity of the query, provisions of an agreement with a subscriber, idle time, etc. SSD component 510 can re-execute staled probes when idle based on the instant rank of staled probes, based on a last probe performed, etc.

Ranking of APN DNS probes can, in some instances, be associated with the popularity of a service, application, environment, etc., e.g., the frequency with which an APN DNS query for said service, application, environment, etc., is received. In an aspect, evaluation of network conditions and characteristics by SSD component 510 can be related to the popularity of a service, application, environment, etc. As such, preferred DNS responses can be stored/refreshed with a higher priority such that they can be more readily made accessible to SSD component 510 via probe result storage component 550 than less popular APN DNS queries. In these instances, less popular APN DNS queries can be relegated to real-time probing and/or to conventional DNS responses. As such, responses to an APN DNS query for popular service, application(s), environment(s), etc., can be based on stored preferred response(s) rather than running a real-time evaluation for these popular APN DNS queries. In an aspect, a real-time evaluation, e.g., probe, can be forced despite a stored result being available. In some embodiments, the popularity of a service, application, environment, etc., can be based on metrics other than a frequency of receiving an APN DNS query.

In another aspect, SSD component 510 can limit APN DNS query resolution to EPC group 540. This can serve to limit resolution of a DNS query to networks having devices comprised in EPC group 540. As a result, SSD resolution can be segmented into regions associated with EPC group 540. In an aspect, SSD component 510 can comprise modify EPC group component 560 that can add or remove an EPC device or other device to/from EPC group 540. This can further enable adjusting the footprint of EPC group 540. Of note, in some embodiments an EPC device can be included in one or more EPC groups, e.g., 540, etc. Modification of EPC group membership can be directed by SSD component 510 in response to determinations made thereby, e.g., satisfying a rule related to EPC group membership, in response to commands received from other devices and/or operators associated with an operators of SSD component 510, in response to information contained in the APN DNS query, etc. As an example, a rule can cause additional devices to be added to EPC group 540 where no satisfactory DNS response can be determined from the existing members of EPC group 540. As another example, an APN DNS query can designate specific devices to be included in EPC group 540. In an aspect, EPC device(s) can be ranked by target EPC ranking component 570. Target EPC ranking component 570 can rank and/or order EPC device(s) considered for membership in EPC group 540 based on EPC ranking rules related to designating a preference for characteristics of the EPC devices being ranked, e.g., black list, white list, ownership of the device (same/different network), location/country/region, proximity to a UE, number of network hops to reach the device, etc. As an example, a network service provider can explicitly exclude a device such that it cannot be added to EPC group 540, or explicitly insist that the device be included in EPC group 540.

In an aspect, SSD component 510 can return a DNS result in response to an APN DNS query based on a real-time probe, via emulation probe component 530, and/or based on historical probes. Where historical probes are employed, SSD component 510 can evaluate an instant APN DNS query, via APN DNS query I/O component 520, against a criterion associated with historical APN DNS probe results, via historical query component 532 that can be accessed via probe result storage component 550. This can enable historical query component 532 to determine a level of similarity between the instant query and historical queries. Where the level of similarity is determined to be sufficient, e.g., satisfying a rule related to the level of similarity, then the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, SSD component 510 readily allows for returning a response to an APN DNS query based on an intelligent evaluation of network conditions, including congestion occurring on the network, availability of end-to-end service, subscriber rating, expected capacity of the candidate target(s), maintenance activities, down network(s), impaired network(s), systems that are failing to respond, dissimilar environment size/capacity, etc. SSD component 510 allows for real-time and historical newton evaluation, e.g., a probe, via emulation of devices performing an APN DNS query. Historical probe results can be stored and compared to an incoming APN DNS query to determine if they are sufficiently similar that a historical DNS response can be employed. Moreover, SSD component 510 can rank historical probes to determine re-execution of staled probes. Additionally, a popularity can be associated with an APN DNS probe such that it can be evaluated and stored in a prophylactic manner, e.g., the probe can be executed and stored in the absence of receiving an actual APN DNS query, allowing a rapid response should a sufficiently similar APN DNS query be received thereafter. It will be noted that all of these aspects are significant improvements to conventional APN DNS resolution.

Figure 6:
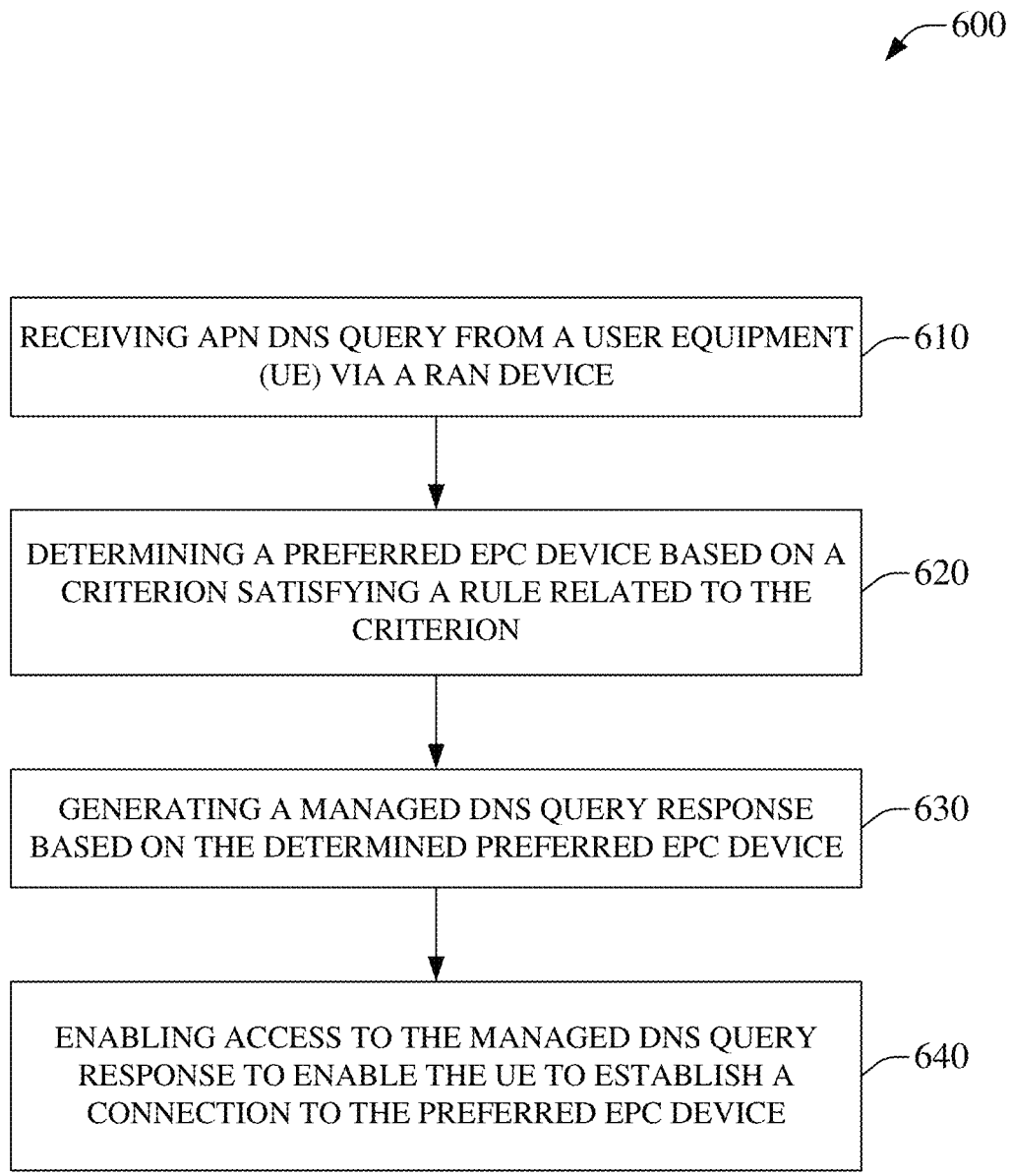
FIG. 6 illustrates an example method facilitating determining a managed DNS query response based on probing an EPC device in accordance with aspects of the subject disclosure.
Figure 7:
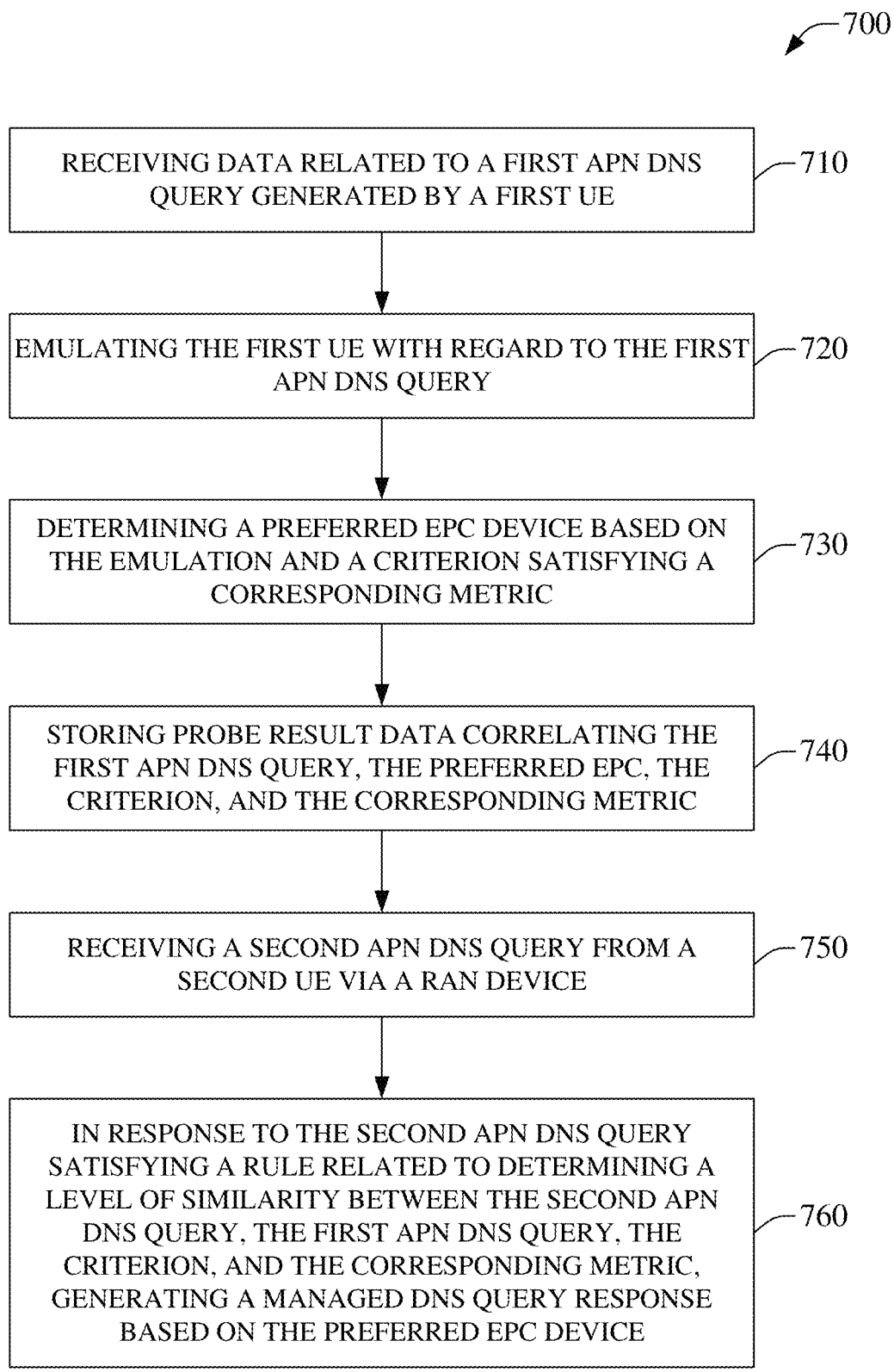
FIG. 7 depicts an example method facilitating determining a managed DNS query response based on probing a set of EPC devices and historical corresponding probe results in accordance with aspects of the subject disclosure.
Figure 8:
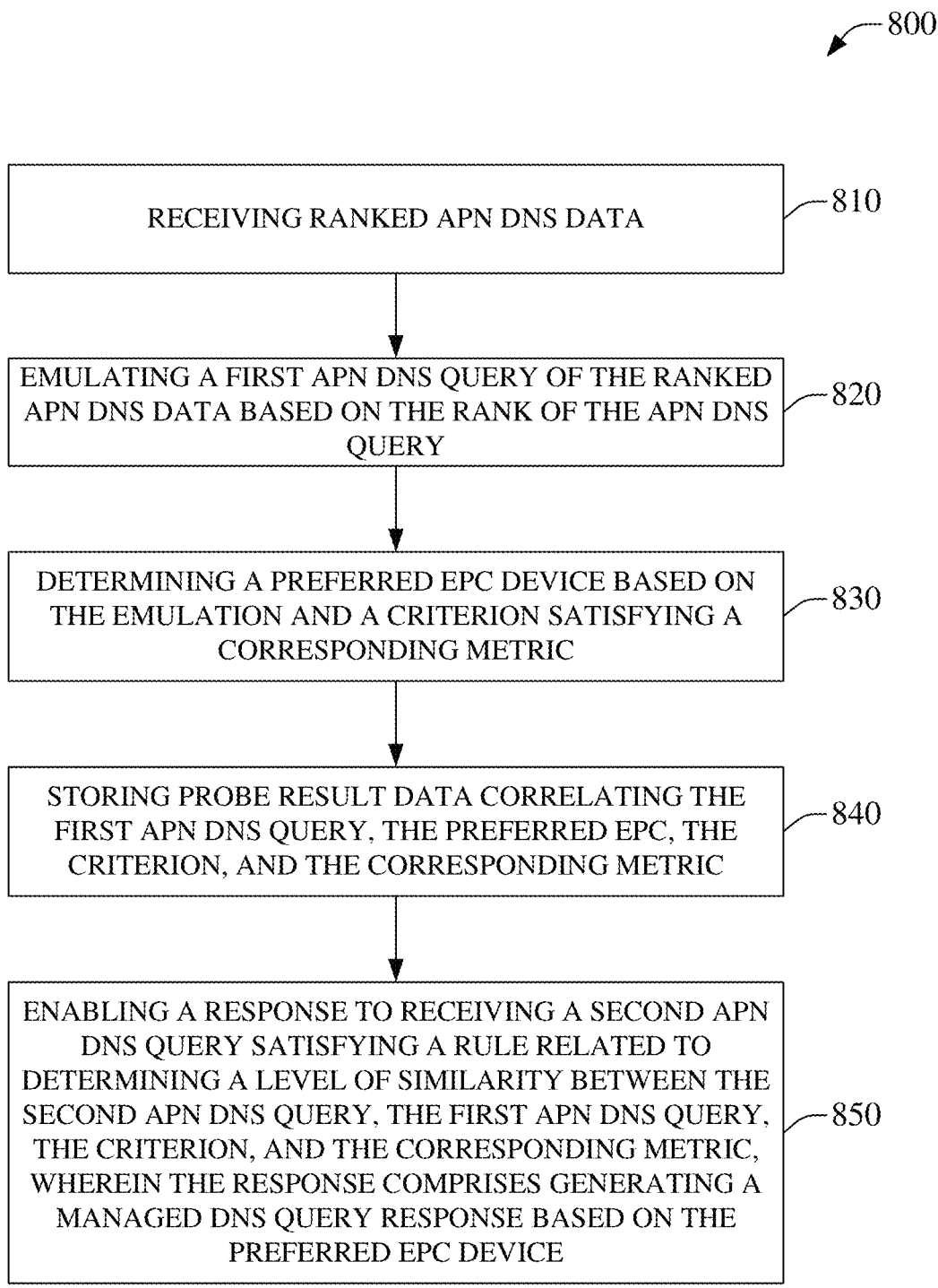
FIG. 8 illustrates an example method facilitating determining a managed DNS query response based on probing a set of EPC devices corresponding to ranked APN DNS data and historical corresponding probe results in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates a method 600 that facilitates determining a managed DNS query response based on probing an EPC device in accordance with aspects of the subject disclosure. At 610, method 600 can comprise receiving an APN DNS query from a UE via a RAN device. An APN DNS query and/or response can be associated with directing mobile network subscribers to an appropriate network device(s) that can be related to environments that can expose subscribers to resources like internet access, enterprise networks, VoLTE service or other mobility application(s).

At 620, method 600 can comprise, determining a preferred EPC device, e.g., the EPC device and/or one or more network resources beyond the EPC device associated with fully resolving an APN DNS query, based on a criterion satisfying a rule related to ordering or ranking EPC devices based on the criterion. The criterion can be determined from emulating an APN DNS query to probe or evaluate various possible resolutions of the APN DNS query in a modern computer network. Emulation of the APN DNS query can determine one or more characteristics associated with resolving the APN DNS query to each of the servers comprising the plurality of servers. As such, the emulation can enable selection of a preferred response to the APN DNS query based on a determined on the characteristic satisfying a rule related to a criterion. Therefore, where a service is determined to be unavailable, slow, costly, unreliable, etc., e.g., characteristics of a possible DNS resolution, preference can be given to one DNS resolution over another based on the characteristics satisfying a rule related to a criterion, e.g., the device is available, supports a determined communication speed, is within a determined cost window, demonstrates a determined level of reliability, etc.

Probing of EPC devices, etc., can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable. Of note, probing the EPC device can be, in some instances, a shorthand term meaning probing a network resource chain associated with resolution of an APN DNS or DNS query in that where a query for a networked resource or network address can be routed via a plurality of network paths, one or more of these paths can be examined to determine associated characteristics that can then be employed in selecting a preferred resolved DNS reply that can designate a network resource, service, or address, and/or a route to connect thereto.

At 630, method 600 can comprise, generating a managed DNS query response based on the determined preferred EPC device. In an aspect, the managed DNS query response can comprise information identifying an EPC device, and/or endpoint device, and information enabling the UE to fully resolve a path to allow a connection to be established with the EPC device and/or endpoint device.

Method 600, at 640, can enable a UE to access the managed DNS query response. This can provide enablement of the UE to establish a connection to the preferred EPC device and/or endpoint device associated with an environment that can expose a subscriber to resources like internet access, enterprise networks, VoLTE service, etc. At this point method 600 can end.

In an aspect, results of APN DNS probing/evaluations can be stored and accessed as part of generating the managed DNS query response at 630. This can increase the response speed to a received APN DNS query by enabling the use of historical results in responding to the APN DNS query. In some embodiments, the stored results can be associated with a staling or aging value, such that when the results are deemed sufficiently old, a new probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, the ranking can be based on characteristics such as popularity of the query, provisions of an agreement with a subscriber, idle time, etc. As an example, where a first APN DNS query occurs more often than a second APN DNS query, where a probe related to the first query and a probe related to the second query each go stale, the first APN DNS probe can be re-executed before the second APN DNS probe is re-executed. In another example, a contractual agreement with a provider of a service can be associated with ranking probes associated with the provider of the service higher than other unaffiliated probes and, as such, refreshing of staled probes for the service can be performed ahead of staled probes for other queries that are not associated with the service.

Ranking of APN DNS probes can be associated with the popularity of a service, application, environment, etc., e.g., the frequency with which an APN DNS query for said service, application, environment, etc., is received. In an aspect, evaluation of network conditions and characteristics can be related to the popularity of a service, application, environment, etc. As such, preferred DNS responses can be stored and made accessible to such that a response to an APN DNS query for popular service(s), application(s), environment(s), etc., can be more frequently based on the stored preferred responses rather than running a real-time evaluation. In an aspect, a real-time evaluation, e.g., probe, can be forced despite a stored result being available. In an example, the real-time evaluation can be forced based on a user indicated preference, a message from a server of a change in status, based on contractual agreements, or nearly any other factor. In some embodiments, the popularity of a service, application, environment, etc., can be based on metrics other than a frequency of receiving an APN DNS query. As such, popular terms, for example as indicated by a search engine provider, can be employed in determining a ranking of APN DNS query probes.

In another aspect, APN DNS query resolution can be limited to a determined EPC group that can comprise one or more EPC device. This can serve to limit resolution of a DNS query to networks comprising the EPC device(s) of the EPC group. As a result, resolutions can be segmented into regions associated with the EPC group. This can further enable adjusting the footprint of an EPC group. Of note, in some embodiments an EPC device can be included in one or more EPC groups.

In an aspect, a managed DNS query response to an APN DNS query can be based on a real-time probe and/or based on historical probes. Where historical probes are employed, an instant APN DNS query can be evaluated based on a criterion associated with historical APN DNS probe results. This can enable determining a level of similarity between the instant query and historical queries. Where the level of similarity is determined to be sufficient, e.g., satisfying a rule related to the level of similarity, then the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, responses to an APN DNS query can be based on an intelligent evaluation of network conditions, including congestion occurring on the network, availability of end-to-end service, subscriber rating, expected capacity of the candidate target(s), maintenance activities, down network(s), impaired network(s), systems that are failing to respond, dissimilar environment size/capacity, etc. Method 600 can allow for real-time and historical network evaluation, e.g., a probe, via emulation of devices performing an APN DNS query. Historical probe results can be stored and compared to an incoming APN DNS query to determine if they are sufficiently similar that a historical DNS response can be employed. Moreover, historical probes can be ranked to determine an order for re-execution of staled probes. Additionally, popularity metric can be associated with APN DNS probes such that they can be evaluated and stored in a in the absence of receiving an actual APN DNS query, thereby allowing a rapid response should a sufficiently similar APN DNS query be received thereafter. It will be noted that all of these aspects are significant improvements to conventional APN DNS resolution.

FIG. 7 illustrates a method 700 that facilitates determining a managed DNS query response based on probing a set of EPC devices and historical corresponding probe results in accordance with aspects of the subject disclosure. At 710, method 700 can comprise receiving data related to a first APN DNS query generated by a first UE. An APN DNS query and/or response can be associated with directing mobile network subscribers to an appropriate network device(s) that can be related to environments that can expose subscribers to resources like internet access, enterprise networks, VoLTE service or other mobility application(s).

At 720, method 700 can comprise, emulating the first UE with regard to the first APN DNS query. Emulation of the UE, e.g., attempting to resolve the APN DNS query, can determine one or more characteristics associated with resolving the APN DNS query to each of the servers comprising the plurality of servers. As such, the emulation can enable selection of a preferred response to the APN DNS query based on a determined on the characteristic satisfying a rule related to a criterion. Therefore, where a service is determined to be unavailable, slow, costly, unreliable, etc., e.g., characteristics of a possible DNS resolution, preference can be given to one DNS resolution over another based on the characteristics satisfying a rule related to a criterion, e.g., the device is available, supports a determined communication speed, is within a determined cost window, demonstrates a determined level of reliability, etc.

Probing of EPC devices, e.g., the EPC device and/or one or more network resources beyond the EPC device associated with fully resolving an APN DNS query, can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable. Of note, probing the EPC device can be, in some instances, a shorthand term meaning probing a network resource chain associated with resolution of an APN DNS or DNS query in that where a query for a networked resource or network address can be routed via a plurality of network paths, one or more of these paths can be examined to determine associated characteristics that can then be employed in selecting a preferred resolved DNS reply that can designate a network resource, service, or address, and/or a route to connect thereto.

At 730, method 700 can comprise, determining a preferred EPC device based on the emulation and a criterion satisfying a corresponding metric. In an aspect, the criterion can indicate when the metric is satisfied and allow sorting, ordering, or ranking of probe results based on the characteristics of the network determined for each probe. Where a probe result indicates characteristics that meet the criterion that satisfies the metric better than other probe results, said probe result can be selected as a preferred resolution of the APN DNS query.

At 740, method 700 can comprise, storing probe result data correlating the first APN DNS query, the preferred EPC device, the criterion, and the corresponding metric. In an aspect, results of APN DNS probing/evaluations can be stored and accessed as part of generating a managed DNS query response below at 760. Storing historical information correlated to results and conditions can increase the response speed to a received APN DNS query by enabling the use of historical results in responding to the APN DNS query.

At 750, method 700 can comprise, receiving a second APN DNS query generated by a second UE via a RAN device. Again, the APN DNS query and/or response can be associated with directing mobile network subscribers to an appropriate network device(s) that can be related to environments that can expose subscribers to resources.

Method 700, at 760, can comprise generating a managed DNS query response. Generating a managed DNS query response can be in response to the second APN DNS query satisfying a rule related to determining a level of similarity between the second APN DNS query, the first APN DNS query, the criterion, and the corresponding metric, e.g., where the first and second APN DNS query are similar in both a target service/environment, and designated criteria and metrics, then a managed DNS query response to the second APN DNS query can be based on the response to the first APN DNS query. As such, the generating the managed DNS query response can be based on the preferred EPC device determined at 730 and stored at 740. At this point method 700 can end.

Stored results can be associated with a staling or aging value, such that when the results are deemed sufficiently old, a new probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, the ranking can be based on characteristics such as popularity of the query, provisions of an agreement with a subscriber, idle time, etc. As an example, where a first APN DNS query occurs more often than a second APN DNS query, where a probe related to the first query and a probe related to the second query each go stale, the first APN DNS probe can be re-executed before the second APN DNS probe is re-executed. In another example, a contractual agreement with a provider of a service can be associated with ranking probes associated with the provider of the service higher than other unaffiliated probes and, as such, refreshing of staled probes for the service can be performed ahead of staled probes for other queries that are not associated with the service.

Ranking of APN DNS probes can be associated with the popularity of a service, application, environment, etc., e.g., the frequency with which an APN DNS query for said service, application, environment, etc., is received. In an aspect, evaluation of network conditions and characteristics can be related to the popularity of a service, application, environment, etc. As such, preferred DNS responses can be stored and made accessible to such that a response to an APN DNS query for popular service(s), application(s), environment(s), etc., can be more frequently based on the stored preferred responses rather than running a real-time evaluation. In an aspect, a real-time evaluation, e.g., probe, can be forced despite a stored result being available. In an example, the real-time evaluation can be forced based on a user indicated preference, a message from a server of a change in status, based on contractual agreements, or nearly any other factor. In some embodiments, the popularity of a service, application, environment, etc., can be based on metrics other than a frequency of receiving an APN DNS query. As such, popular terms, for example as indicated by a search engine provider, can be employed in determining a ranking of APN DNS query probes.

In another aspect, APN DNS query resolution can be limited to a determined EPC group that can comprise one or more EPC device. This can serve to limit resolution of a DNS query to networks comprising the EPC device(s) of the EPC group. As a result, resolutions can be segmented into regions associated with the EPC group. This can further enable adjusting the footprint of an EPC group. Of note, in some embodiments an EPC device can be included in one or more EPC groups.

In an aspect, a managed DNS query response to an APN DNS query can be based on a real-time probe and/or based on historical probes. Where historical probes are employed, an instant APN DNS query can be evaluated based on a criterion associated with historical APN DNS probe results. This can enable determining a level of similarity between the instant query and historical queries. Where the level of similarity is determined to be sufficient, e.g., satisfying a rule related to the level of similarity, then the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, responses to an APN DNS query can be based on an intelligent evaluation of network conditions, including congestion occurring on the network, availability of end-to-end service(s), subscriber rating, expected capacity of the candidate target(s), maintenance activities, down network(s), impaired network(s), systems that are failing to respond, dissimilar environment size/capacity, etc. Method 700 can allow for real-time and historical network evaluation, e.g., a probe, via emulation of devices performing an APN DNS query. Historical probe results can be stored and compared to an incoming APN DNS query to determine if they are sufficiently similar that a historical DNS response can be employed. Moreover, historical probes can be ranked to determine an order for re-execution of staled probes. Additionally, popularity metric can be associated with APN DNS probes such that they can be evaluated and stored in a in the absence of receiving an actual APN DNS query, thereby allowing a rapid response should a sufficiently similar APN DNS query be received thereafter. It will be noted that all of these aspects are significant improvements to conventional APN DNS resolution.

FIG. 8 illustrates a method 800 that facilitates determining a managed DNS query response based on probing a set of EPC devices corresponding to ranked APN DNS data and historical corresponding probe results in accordance with aspects of the subject disclosure. At 810, method 800 can comprise receiving ranked APN DNS data. Ranked APN DNS data can comprise information related to APN DNS queries that designates an ordering, sorting, or ranking of the APN DNS queries to enable probing of the APN DNS queries in a manner that corresponds to the ordering, sorting, or ranking. In an aspect, ranked APN DNS data enables probing of APN DNS queries in an order related to a likelihood that a system may receive a APN DNS query, e.g., a popular APN DNS query is more likely to be received for resolution and therefore can be higher ranked with regard to performing a probe of the APN DNS query such that a response can be readily provided, etc. As an example, an APN DNS query for a popular video service can be higher ranked than a APN DNS query for an obscure UE tracking service based on the likelihood that a APN DNS query for the video service is more likely to be received than an APN DNS query for the UE tracking service. Ranking, ordering, or sorting can also be premised on other factors, e.g., APN DNS queries for service(s) associated with a network provider associated with SSD can be ranked higher than APN DNS queries for a competing network provider not associated with the SSD, etc.

At 820, method 800 can comprise, emulating a first APN DNS query of the ranked APN DNS query data based on the rank, order, or sort of the APN DNA query. Emulation of the UE, e.g., attempting to resolve the APN DNS query, can determine one or more characteristics associated with resolving the APN DNS query to each of the servers comprising the plurality of servers. As such, the emulation can enable selection of a preferred response to the APN DNS query based on a determined on the characteristic satisfying a rule related to a criterion. Therefore, where a service is determined to be unavailable, slow, costly, unreliable, etc., e.g., characteristics of a possible DNS resolution, preference can be given to one DNS resolution over another based on the characteristics satisfying a rule related to a criterion, e.g., the device is available, supports a determined communication speed, is within a determined cost window, demonstrates a determined level of reliability, etc.

Probing of EPC devices, e.g., the EPC device and/or one or more network resources beyond the EPC device associated with fully resolving an APN DNS query, can occur in response to a received APN DNS query, and response time can be slowed due to extending the typical response time by the time needed to perform the evaluation of the results of the emulation. As such, the increase in time can be associated with real-time selection of a DNS response comprising a preferred resolution of the APN DNS query. However, the end result can be an improved user experience, which can be preferable despite any increase in response time associated with probing network resources, e.g., an increase in response time to an APN DNS query can indicates a server that is faster, more reliable, cheaper, etc., than a server that would have been indicated in a conventional DNS response can be preferable. Of note, probing the EPC device can be, in some instances, a shorthand term meaning probing a network resource chain associated with resolution of an APN DNS or DNS query in that where a query for a networked resource or network address can be routed via a plurality of network paths, one or more of these paths can be examined to determine associated characteristics that can then be employed in selecting a preferred resolved DNS reply that can designate a network resource, service, or address, and/or a route to connect thereto.

At 830, method 800 can comprise, determining a preferred EPC device based on the emulation at 820, and a criterion satisfying a corresponding metric. In an aspect, the criterion can indicate when the metric is satisfied and allow sorting, ordering, or ranking of probe results based on the characteristics of the network determined for each probe. Where a probe result indicates characteristics that meet the criterion that satisfies the metric better than other probe results, said probe result can be selected as a preferred resolution of the APN DNS query.

At 840, method 800 can comprise, storing probe result data correlating the first APN DNS query, the preferred EPC device, the criterion, and the corresponding metric. In an aspect, results of APN DNS probing/evaluations can be stored and accessed as part of generating a managed DNS query response. Storing historical information correlated to results and conditions can increase the response speed to a received APN DNS query by enabling the use of historical results in responding to the APN DNS query.

At 850, method 800 can comprise, enabling a response to receiving a second APN DNS query satisfying a rule related to determining a level of similarity between the second APN DNS query, the first APN DNS query, the criterion, and the corresponding metric, e.g., where the first and second APN DNS query are similar in both a target service/environment, and designated criteria and metrics, then a managed DNS query response to the second APN DNS query can be based on the response to the first APN DNS query. As such, the generating the managed DNS query response can be based on the preferred EPC device determined at 830 and stored at 840 with corresponding data. At this point method 800 can end. In an aspect, method 800 can facilitate generating stored probe result data for a ranked set of training APN DNS queries determined as likely queries, such that, when an APN DNS query is received, it can be compared to the stored training data to return a result more quickly than a real-time probe of possible APN DNS query resolutions.

Stored results can be associated with a staling or aging value, such that when the results are deemed sufficiently old, a new probe can be initiated. In some embodiments, the initiation of a new probe can be automatic, such that when the probe stales, it is automatically re-probed without needing to receive a further query. In other embodiments, the initiation of a new probe can be triggered, e.g., when an APN DNS query arrives and the probe is deemed stale, a re-probe can be initiated. In still other embodiments, the initiation of a new probe can be initiated based on a rank of the probe, such that where the probe is sufficiently highly ranked and the probe stales, it is automatically re-probed without needing to receive a further query. In this embodiment, the ranking can be based on characteristics such as popularity of the query, provisions of an agreement with a subscriber, idle time, etc. As an example, where a first APN DNS query occurs more often than a second APN DNS query, where a probe related to the first query and a probe related to the second query each go stale, the first APN DNS probe can be re-executed before the second APN DNS probe is re-executed. In another example, a contractual agreement with a provider of a service can be associated with ranking probes associated with the provider of the service higher than other unaffiliated probes and, as such, refreshing of staled probes for the service can be performed ahead of staled probes for other queries that are not associated with the service.

Ranking of APN DNS probes can be associated with the popularity of a service, application, environment, etc., e.g., the frequency with which an APN DNS query for said service, application, environment, etc., is received. In an aspect, evaluation of network conditions and characteristics can be related to the popularity of a service, application, environment, etc. As such, preferred DNS responses can be stored and made accessible to such that a response to an APN DNS query for popular service(s), applications, environments, etc., can be more frequently based on the stored preferred responses rather than running a real-time evaluation. In an aspect, a real-time evaluation, e.g., probe, can be forced despite a stored result being available. In an example, the real-time evaluation can be forced based on a user indicated preference, a message from a server of a change in status, based on contractual agreements, or nearly any other factor. In some embodiments, the popularity of a service, application, environment, etc., can be based on metrics other than a frequency of receiving an APN DNS query. As such, popular terms, for example as indicated by a search engine provider, can be employed in determining a ranking of APN DNS query probes.

In another aspect, APN DNS query resolution can be limited to a determined EPC group that can comprise one or more EPC device. This can serve to limit resolution of a DNS query to networks comprising the EPC device(s) of the EPC group. As a result, resolutions can be segmented into regions associated with the EPC group. This can further enable adjusting the footprint of an EPC group. Of note, in some embodiments an EPC device can be included in one or more EPC groups.

In an aspect, a managed DNS query response to an APN DNS query can be based on a real-time probe and/or based on historical probes. Where historical probes are employed, an instant APN DNS query can be evaluated based on a criterion associated with historical APN DNS probe results. This can enable determining a level of similarity between the instant query and historical queries. Where the level of similarity is determined to be sufficient, e.g., satisfying a rule related to the level of similarity, the results associated with the historically similar results can be employed in responding to the instant APN DNS query. Criterion can include, time of day, day of week, location, device type or other device characteristics, subscriber ranking or subscriber agreement(s), age of historical probes, known changes in network conditions, etc.

In some embodiments, responses to an APN DNS query can be based on an intelligent evaluation of network conditions, including congestion occurring on the network, availability of end-to-end service(s), subscriber rating, expected capacity of the candidate target(s), maintenance activities, down network(s), impaired network(s), systems that are failing to respond, dissimilar environment size/capacity, etc. Method 800 can allow for real-time and historical network evaluation, e.g., a probe, via emulation of devices performing an APN DNS query. Historical probe results can be stored and compared to an incoming APN DNS query to determine if they are sufficiently similar that a historical DNS response can be employed. Moreover, historical probes can be ranked to determine an order for re-execution of staled probes. Additionally, popularity metric can be associated with APN DNS probes such that they can be evaluated and stored in a in the absence of receiving an actual APN DNS query, thereby allowing a rapid response should a sufficiently similar APN DNS query be received thereafter. It will be noted that all of these aspects are significant improvements to conventional APN DNS resolution.

Figure 9:
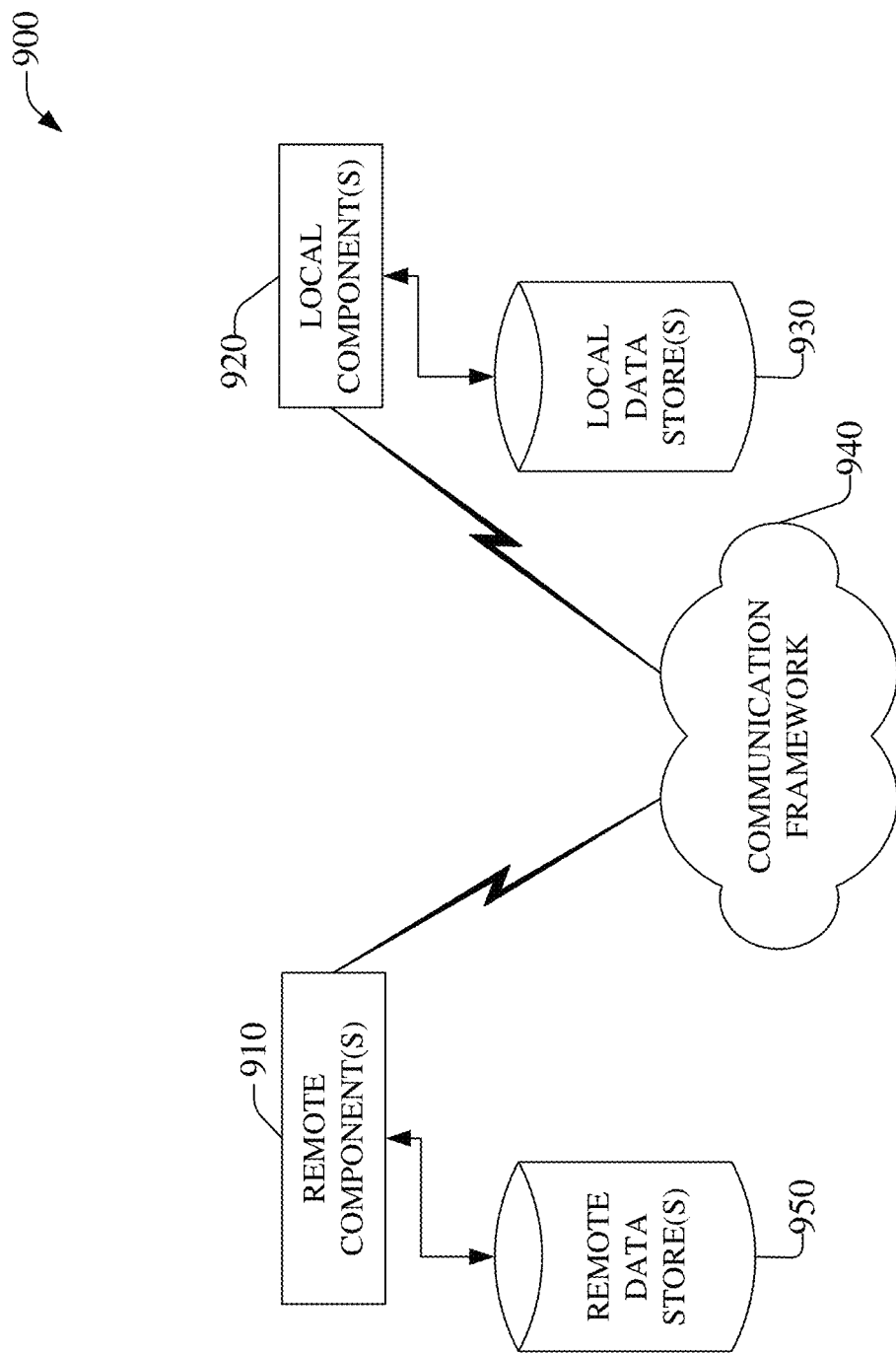
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be UE 202, RAN 204, EPC group 240-540, etc., or devices comprising EPC group 240-540, etc. a data storage component remotely connect to probe result storage component 250-550, etc.

The system 900 also comprises one or more local component(s) 920. The local component(s) 920 can be hardware and/or software (e.g., threads, processes, computing devices). In some embodiments, local component(s) 920 can comprise, for example, SSD component 110-510, MME 306-506, EPC group 240-540, etc., or devices comprising EPC group 240-540, etc., a local data storage component comprised in probe result storage component 250-550, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
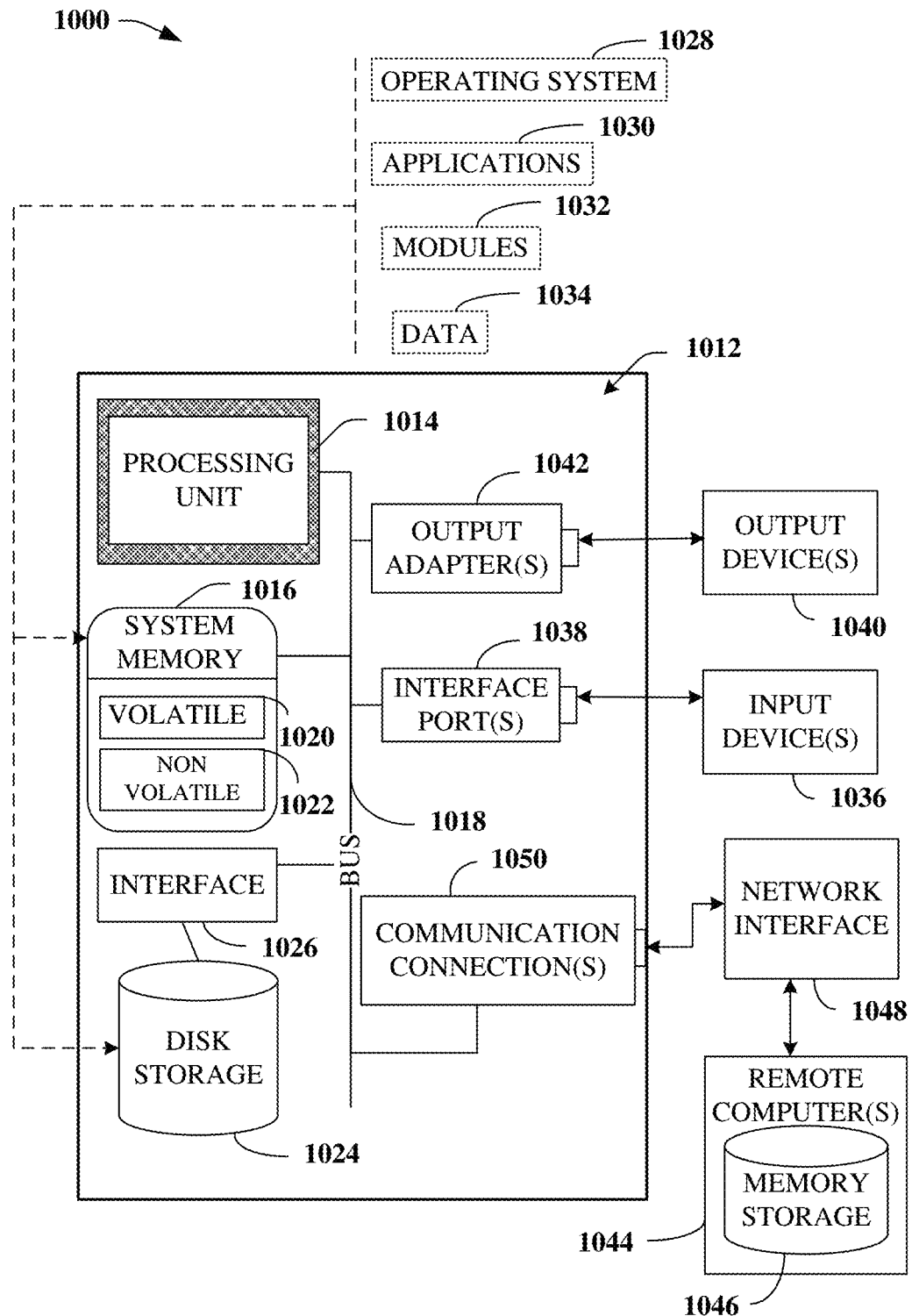
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, SSD component 110-510, MME 306-506, UE 202, RAN 204, EPC components 241-243 and 341-343, or endpoint devices comprised in EPC group 240-540, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving trigger information a remote device, e.g., a UE, and in response, generating communication augmentation information that can be accessed via an air interface or other wireless interface by one or more service interface components or other UEs to enable context sensitive communication augmentation.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse input GUI, a command line controlled interface, etc., allowing a user to interact with computer 1012. As an example, UE 202, SSD component(s) 210-510, etc., can receive touch, motion, audio, visual, or other types of input, e.g., SSD component 210-510 can receive white lists, black lists, etc., as input by a user via a user interface that is located either local or remote from the SSD component, etc. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
    a processor; and
    a memory that stores executable instructions that, when executed by the processor, facilitate performance of operations, comprising:
        emulating an interaction between a first user equipment and a first evolved packet core device based on a characteristic of the first evolved packet core device and a result of evaluating a criterion;
        determining, based on the emulating, a ranking of a network path of network paths between the first user equipment and the first evolved packet core device; and
        enabling the first user equipment to establish a first connection to the first evolved packet core device via providing a first response to a first user equipment query, wherein the first user equipment query is a first access point name domain name service query, wherein the first response is a first managed domain name service query response, and wherein the first response is based on the ranking.

2. The device of claim 1, wherein the operations further comprise:
    in response to receiving a second user equipment query, generating a second response enabling a second user equipment to establish a second connection to the first evolved packet core device, wherein the second response is based on a level of similarity determined to be between the first user equipment query and the second user equipment query according to a defined similarity criterion.

3. The device of claim 1, wherein the operations further comprise:
    in response to receiving a second query, generating a second response enabling a second user equipment to establish a second connection to a second evolved packet core device, wherein the second response is based on a level of similarity determined to be between the first user equipment query and the second user equipment query according to a defined similarity criterion.

4. The device of claim 1, wherein determining the ranking comprises reducing the ranking of the network path relative to other network paths, other than the network path, in response to the emulating indicating that the interaction transitioned a threshold level of network congestion.

5. The device of claim 1, wherein determining the ranking comprises reducing the ranking of the network path relative to other network paths, other than the network path, in response to the emulating indicating that the interaction transitioned a threshold level of resource loading level.

6. The device of claim 1, wherein determining the ranking comprises reducing the ranking of the network path relative to other network paths, other than the network path, in response to the emulating indicating that a resource is unavailable via the interaction.

7. The device of claim 1, wherein determining the ranking comprises reducing the ranking of the network path relative to other network paths, other than the network path, in response to the emulating indicating that the interaction transitioned an arrival capacity for a candidate target environment.

8. The device of claim 1, wherein determining the ranking comprises reducing the ranking of the network path relative to other network paths, other than the network path, in response to the emulating indicating that the interaction transitioned a threshold cost of access to a service via the network path.

9. The device of claim 1, wherein determining the ranking comprises reducing the ranking of the network path relative to other network paths, other than the network path, in response to the emulating indicating that the interaction transitioned a threshold speed of access to a service.

10. The device of claim 1, wherein determining the ranking comprises reducing the ranking of the network path relative to other network paths, other than the network path, in response to the emulating indicating that the interaction transitioned a level of reliability of access to a service.

11. A method, comprising:
    determining, by a system comprising a processor, a ranking of a network path of network paths between a first user equipment and first network endpoint equipment, wherein the ranking is based on emulating an interaction between the first user equipment and the first evolve network endpoint equipment based on a characteristic of the first network endpoint equipment and an evaluation of a criterion; and
    sending, by the system to the first user equipment, a first response to a first query from the first user equipment, wherein the first response facilitates the first user equipment establishing a first connection to the first network endpoint equipment, wherein the first query is a first access point name domain name service query, wherein the first response is a first managed domain name service query response, and wherein the first response is based on the ranking.

12. The method of claim 11, further comprising, sending, by the system to a second user equipment, a second response enabling the second user equipment to establish a second connection to the first network endpoint equipment, wherein the second response is based on a level of similarity between the first query and a second query from the second user equipment.

13. The method of claim 11, further comprising, sending, by the system to a second user equipment, a second response enabling the second user equipment to establish a second connection to a second network endpoint equipment, wherein the second response is based on a level of similarity between the first query and a second query from the second user equipment.

14. The method of claim 11, wherein determining the ranking further comprises reducing the ranking of the network path relative to other network paths in response to the emulating indicating that the interaction transitions a threshold level of network congestion.

15. The method of claim 11, wherein determining the ranking further comprises reducing the ranking of the network path relative to other network paths in response to the emulating indicating that the interaction transitions a threshold level of resource loading level.

16. The method of claim 11, wherein determining the ranking further comprises reducing the ranking of the network path relative to other network paths in response to the emulating indicating that the interaction transitions an arrival capacity for a candidate target environment.

17. The method of claim 11, wherein determining the ranking further comprises reducing the ranking of the network path relative to other network paths in response to the emulating indicating that the interaction transitions a level of reliability of access to a service.

18. A non-transitory machine-readable medium, comprising executable instructions that, when executed by a processor, facilitate performance of operations, comprising:
emulating an interaction, wherein the interaction being emulated is between a user equipment and an evolved packet core device and is based on a characteristic of the evolved packet core device and a criterion;
determining a ranking of a path of network paths between the user equipment and the evolved packet core device, wherein the ranking is based on the emulating;
receiving a query, wherein the query is an access point name domain name service query;
determining a response to the query based on the ranking of the path, wherein the response is a managed domain name service query response; and
enabling access to the response to facilitate the user equipment establishing a connection to the evolved packet core device.

19. The non-transitory machine-readable medium of claim 18, wherein determining the ranking further comprises reducing the ranking of the path relative to other network paths, other than the path, in response to the emulating indicating that the interaction has transitioned a threshold level of network congestion.

20. The non-transitory machine-readable medium of claim 18, wherein determining the ranking further comprises reducing the ranking of the path relative to other network paths, other than the path, in response to the emulating indicating that the interaction has transitioned a threshold level of resource loading level.

* * * * *